(12) United States Patent
Nogami et al.

(10) Patent No.: US 9,998,264 B2
(45) Date of Patent: Jun. 12, 2018

(54) USER EQUIPMENTS, BASE STATIONS AND METHODS FOR CARRIER AGGREGATION

(71) Applicant: Sharp Laboratories of America, Inc., Camas, WA (US)

(72) Inventors: Toshizo Nogami, Vancouver, WA (US); Zhanping Yin, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 126 days.

(21) Appl. No.: 15/093,431

(22) Filed: Apr. 7, 2016

(65) Prior Publication Data

US 2016/0302182 A1 Oct. 13, 2016

Related U.S. Application Data

(60) Provisional application No. 62/146,110, filed on Apr. 10, 2015.

(51) Int. Cl.
*H04L 5/00* (2006.01)
*H04L 1/18* (2006.01)
*H04W 72/04* (2009.01)

(52) U.S. Cl.
CPC .......... *H04L 5/0041* (2013.01); *H04L 1/1861* (2013.01); *H04W 72/042* (2013.01); *H04W 72/0446* (2013.01)

(58) Field of Classification Search
CPC ............................ H04L 5/0041; H04L 1/1861
See application file for complete search history.

(56) References Cited

U.S. PATENT DOCUMENTS

| | | | |
|---|---|---|---|
| 8,286,047 B2 | 10/2012 | Che et al. | |
| 8,588,142 B2 | 11/2013 | Seo et al. | |
| 8,606,257 B2 | 12/2013 | Li | |
| 8,724,742 B2 | 5/2014 | Nimbalker et al. | |
| 8,797,957 B2 | 8/2014 | Cheng et al. | |
| 8,855,624 B2 | 10/2014 | Gerstenberger et al. | |
| 2011/0249578 A1* | 10/2011 | Nayeb Nazar | H04L 1/0027 370/252 |

(Continued)

FOREIGN PATENT DOCUMENTS

WO   WO 2015/159351   * 10/2015 ............ H04W 16/32

OTHER PUBLICATIONS

International Search Report and Written Opinion issued for PCT application No. PCT/US2016/026722 dated Jul. 14, 2016.

(Continued)

*Primary Examiner* — Ronald B Abelson
(74) *Attorney, Agent, or Firm* — Austin Rapp

(57) ABSTRACT

A user equipment (UE) is described. The UE includes a higher layer processor configured/programmed to configure a plurality of serving cells. The UE also includes a physical downlink shared channel receiver configured/programmed to receive one or more physical downlink shared channel (PDSCH) in a subframe. The UE further includes a physical layer controller configured/programmed to determine the number of storing soft channel bits on the basis of N. N is the maximum number of serving cells on which the UE is able to receive physical channels in a subframe. N is smaller than the number of the configured serving cells.

4 Claims, 15 Drawing Sheets

(56) References Cited

U.S. PATENT DOCUMENTS

| | | |
|---|---|---|
| 2012/0188952 A1 | 7/2012 | Baldemair et al. |
| 2012/0207130 A1 | 8/2012 | Jang et al. |
| 2012/0275397 A1 | 11/2012 | Hsieh et al. |
| 2013/0051289 A1 | 2/2013 | Hsieh et al. |
| 2013/0121216 A1* | 5/2013 | Chen .................... H04L 1/1835 370/280 |
| 2013/0176981 A1 | 7/2013 | Earnshaw et al. |
| 2013/0242729 A1 | 9/2013 | Chen et al. |
| 2013/0308550 A1 | 11/2013 | Yin et al. |
| 2014/0198758 A1 | 7/2014 | Nimbalker et al. |
| 2014/0241269 A1 | 8/2014 | Smee et al. |

OTHER PUBLICATIONS

Nokia Corporation et al., New WI Proposal: LTE Carrier Aggregation Enhancement Beyond 5 Carriers, 3GPP TSG RAN Meeting 66, RP-142286, Dec. 8, 2014.

3GPP TS 36.306 V12.3.0, "Evolved Universal Terrestrial Radio Access (E-UTRA); User Equipment (UE) Radio Access Capabilities (Release 12)," Dec. 1, 2014.

3GPP TS 36.213 V12.4.0, "Evolved Universal Terrestrial Radio Access (E-UTRA); Physical Layer Procedures (Release 12)," Dec. 1, 2014.

3GPP TS 36.212 v12.3.0, "Evolved Universal Terrestrial Radio Access (E-UTRA); Multiplexing and Channel Coding (Release 12)," Dec. 1, 2014.

* cited by examiner

USER EQUIPMENTS, BASE STATIONS AND METHODS FOR CARRIER AGGREGATION

RELATED APPLICATIONS

This application is related to and claims priority from U.S. Provisional Patent Application No. 62/146,110, entitled "USER EQUIPMENTS, BASE STATIONS AND METHODS FOR CARRIER AGGREGATION," filed on Apr. 10, 2015, which is hereby incorporated by reference herein, in its entirety.

TECHNICAL FIELD

The present disclosure relates generally to communication systems. More specifically, the present disclosure relates to user equipments, base stations and methods for carrier aggregation.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
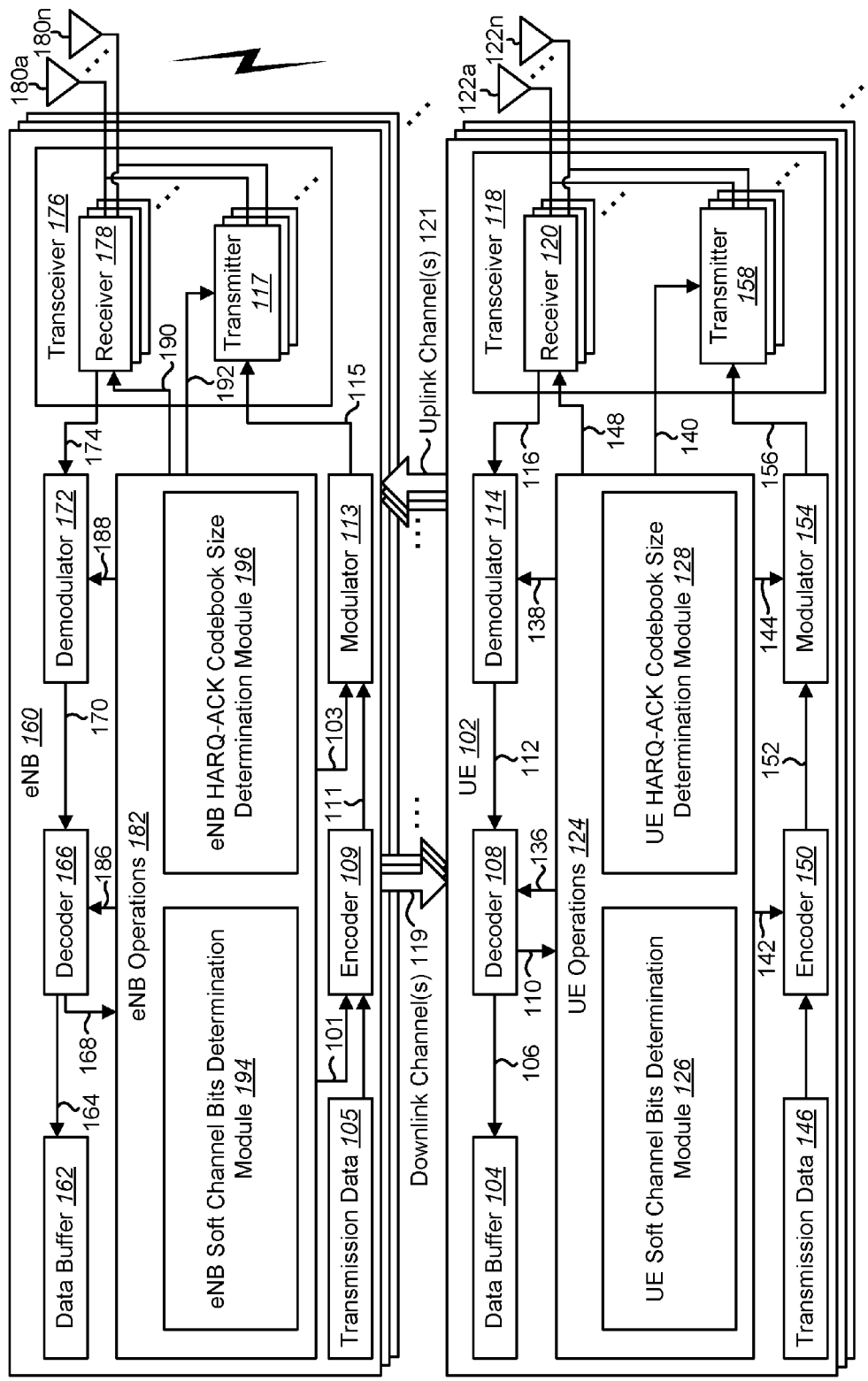
FIG. 1 is a block diagram illustrating one configuration of one or more evolved Node Bs (eNBs) and one or more user equipments (UEs) in which systems and methods for carrier aggregation may be implemented.

A user equipment (UE) is described. The UE includes a higher layer processor configured/programmed to configure a plurality of serving cells. The UE also includes a physical downlink shared channel receiver configured/programmed to receive one or more physical downlink shared channel (PDSCH) in a subframe. The UE further includes a physical layer controller configured/programmed to determine the number of storing soft channel bits on the basis of N. N is the maximum number of serving cells on which the UE is able to receive physical channels in a subframe. N is smaller than the number of the configured serving cells.

N may be derived from capability information of the UE. N may be provided by a base station via a higher layer signaling.

The physical layer controller may determine the number of storing soft channel bits on the basis of the number of the configured serving cells if the number of the configured serving cells is up to 5.

N may be the number of serving cells that are activated. N may be derived from a field in a downlink control information (DCI) format of which a physical downlink control channel (PDCCH) is transmitted in the subframe.

A base station communicating with a UE is also described. The base station includes a higher layer processor configured/programmed to configure, for the UE, a plurality of serving cells. The base station also includes a physical downlink shared channel transmitter configured/programmed to transmit, for the UE, one or more PDSCH in a subframe. The base station further includes a physical layer controller configured/programmed to determine the number of soft channel bits stored by the UE on the basis of N. N is the maximum number of serving cells on which the UE is able to receive physical channels in a subframe. N is smaller than the number of the configured serving cells.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an eNB, a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, one example of a "base station" is an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may consist of a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

When carrier aggregation (CA) is configured, the UE may have one radio resource control (RRC) connection with the network. One radio interface may provide carrier aggregation. During RRC connection establishment, re-establishment and handover, one serving cell may provide non-access stratum (NAS) mobility information (e.g., a tracking area identity (TAI)). During RRC connection re-establishment and handover, one serving cell may provide a security input. This cell may be referred to as the primary cell (PCell). In the downlink, the component carrier corresponding to the PCell may be the downlink primary component carrier (DL PCC), while in the uplink it may be the uplink primary component carrier (UL PCC).

Depending on UE capabilities, one or more secondary cells (SCells) may be configured to form together with the primary cell (PCell) a set of serving cells. In the downlink, the component carrier corresponding to a SCell may be a downlink secondary component carrier (DL SCC), while in the uplink it may be an uplink secondary component carrier (UL SCC).

The configured set of serving cells for the UE, therefore, may consist of one PCell and one or more SCells. For each SCell, the usage of uplink resources by the UE (in addition to the downlink resources) may be configurable. The number of DL SCCs configured may be larger than or equal to the number of UL SCCs and no SCell may be configured for usage of uplink resources only.

From a UE viewpoint, each uplink resource may belong to one serving cell. The number of serving cells that may be configured depends on the aggregation capability of the UE. The PCell may only be changed using a handover procedure (e.g., with a security key change and a random access channel (RACH) procedure). The PCell may be used for transmission of the PUCCH. Unlike the SCells, the PCell may not be deactivated. Re-establishment may be triggered when the PCell experiences radio link failure (RLF), not when the SCells experience RLF. Furthermore, NAS information may be taken from the PCell.

The reconfiguration, addition and removal of SCells may be performed by an RRC. At intra-LTE handover, RRC may also add, remove or reconfigure SCells for usage with a target PCell. When adding a new SCell, dedicated RRC signaling may be used for sending all required system information of the SCell (e.g., while in connected mode, UEs need not acquire broadcasted system information directly from the SCells).

The systems and methods disclosed herein describe carrier aggregation. In some implementations, the systems and methods disclosed herein describe LTE enhanced carrier aggregation (eCA) with hybrid duplexing. In particular, the systems and methods describe downlink (DL) association sets and PDSCH hybrid automatic repeat request acknowledgement/negative acknowledgement (HARQ-ACK) transmission timings that may be used in time division duplexing (TDD) and frequency division duplexing (FDD) carrier aggregation (CA). In one case, a primary cell (PCell) may report uplink control information (UCI). In another case, a secondary cell (SCell) may be configured as a reporting cell for the UCI.

Carrier aggregation refers to the concurrent utilization of more than one carrier. In carrier aggregation, more than one cell may be aggregated to a UE. In one example, carrier aggregation may be used to increase the effective bandwidth available to a UE. The same TDD uplink-downlink (UL/DL) configuration has to be used for TDD CA in Release-10, and for intra-band CA in Release-11. In Release-11, inter-band TDD CA with different TDD UL/DL configurations is supported. The inter-band TDD CA with different TDD UL/DL configurations may provide the flexibility of a TDD network in CA deployment. Furthermore, enhanced interference management with traffic adaptation (eIMTA) (also referred to as dynamic UL/DL reconfiguration) may allow flexible TDD UL/DL reconfiguration based on the network traffic load.

It should be noted that the term "concurrent" and variations thereof as used herein may denote that two or more events may overlap each other in time and/or may occur near in time to each other. Additionally, "concurrent" and variations thereof may or may not mean that two or more events occur at precisely the same time.

A FDD cell requires spectrum (e.g., radio communication frequencies or channels) in which contiguous subsets of the spectrum are entirely allocated to either UL or DL but not both. Accordingly, FDD may have carrier frequencies that are paired (e.g., paired DL and UL carrier frequencies). However, TDD does not require paired channels. Instead, TDD may allocate UL and DL resources on the same carrier frequency. Therefore, TDD may provide more flexibility on spectrum usage. With the increase in wireless network traffic, and as spectrum resources become very precious, new allocated spectrum tends to be fragmented and has smaller bandwidth, which is more suitable for TDD and/or small cell deployment. Furthermore, TDD may provide flexible channel usage through traffic adaptation with different TDD UL/DL configurations and dynamic UL/DL re-configuration.

In the present LTE mechanism, carrier aggregation (CA) with up to 5 component carriers (CCs) is supported. A UE may support simultaneous receptions or transmissions on all configured CCs to be configured with more than one CC. Each DL CC may be a unit of which an Orthogonal Frequency Division Multiplexing (OFDM) baseband signal is generated. A single DL CC or a set of DL CCs may have virtual guard bands to facilitate transmitter (receiver) filtering above/below edge CC(s). Each UL CC may be a unit of which a Single Carrier-Frequency Division Multiple Access (SC-FDMA) baseband signal is generated. A single UL CC or a set of UL CCs may have virtual guard bands to facilitate transmitter (receiver) filtering above/below edge CCs. The enhanced carrier aggregation (eCA) is a new mechanism to support CA with up to 32 CCs. This may introduce extremely high complexity. The described systems and methods provide effective structures for UEs, eNBs and communication methods to support eCA.

One motivation for support of up to 32 CCs in eCA is the LTE Licensed-Assisted Access (LAA) in unlicensed bands, which contain many potential channels. In the unlicensed bands, there could be other network nodes including another operator's LAA nodes and another system's nodes (e.g., Wi-Fi nodes). It may not be easy to have coordination with these kinds of node. Therefore, it may be preferable to avoid collisions with the other nodes as much as possible.

In one approach, a UE may be configured with all possible channels (e.g. 32 serving cells) by an eNB and then only a limited number of serving cells among them is used at a moment (e.g., within a single subframe). This may result in less complexity for the UE than that for supporting the full 32 serving cells. The UE may report, to the eNB, its capability about on how many cells the UE can perform simultaneous receptions/transmissions, in addition to a CA capability.

For CA with up to 5 CCs, stored soft channel bits per serving cell may be defined by using the number of the configured serving cells. Meanwhile, for CA with more than 5 CCs, stored soft channel bits per serving cell may be defined according to a new parameter. This parameter may be based on how many cells the UE can perform simultaneous receptions/transmissions or a number configured by higher layer signaling.

A key issue is how the UE knows which cells should be monitored for reception. The soft buffer for the HARQ process can be determined by the new parameter. But the UE may still need to buffer all cells if it cannot know which cells should be monitored in advance. The described systems and methods present secondary cell configuration methods for eCA.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one configuration of one or more evolved Node Bs (eNBs) 160 and one or more user equipments (UEs) 102 in which systems and methods for carrier aggregation may be implemented. The one or more UEs 102 communicate with one or more eNBs 160 using one or more antennas 122a-n. For example, a UE 102 transmits electromagnetic signals to the eNB 160 and receives electromagnetic signals from the eNB 160 using the one or more antennas 122a-n. The eNB 160 communicates with the UE 102 using one or more antennas 180a-n.

It should be noted that in some configurations, one or more of the UEs 102 described herein may be implemented in a single device. For example, multiple UEs 102 may be combined into a single device in some implementations. Additionally or alternatively, in some configurations, one or more of the eNBs 160 described herein may be implemented in a single device. For example, multiple eNBs 160 may be combined into a single device in some implementations. In the context of FIG. 1, for instance, a single device may include one or more UEs 102 in accordance with the systems and methods described herein. Additionally or alternatively, one or more eNBs 160 in accordance with the systems and methods described herein may be implemented as a single device or multiple devices.

The UE 102 and the eNB 160 may use one or more channels 119, 121 to communicate with each other. For example, a UE 102 may transmit information or data to the eNB 160 using one or more uplink channels 121 and signals. Examples of uplink channels 121 include a PUCCH and a PUSCH, etc. Examples of uplink signals include a demodulation reference signal (DMRS) and a sounding reference signal (SRS), etc. The one or more eNBs 160 may also transmit information or data to the one or more UEs 102 using one or more downlink channels 119 and signals, for instance. Examples of downlink channels 119 include a PDCCH, a PDSCH, etc. Examples of downlink signals include a primary synchronization signal (PSS), a cell-specific reference signal (CRS), and a channel state information (CSI) reference signal (CSI-RS), etc. Other kinds of channels or signals may be used.

Each of the one or more UEs 102 may include one or more transceivers 118, one or more demodulators 114, one or more decoders 108, one or more encoders 150, one or more modulators 154, one or more data buffers 104 and one or more UE operations modules 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data, which may be stored in a data buffer 104. A second UE-decoded signal 110 may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more eNBs 160. The UE operations module 124 may include one or more of a UE soft channel bits determination module 126 and a UE HARQ-ACK codebook size determination module 128.

In one approach, CA may be performed with up to 5 CCs. Carrier Aggregation (CA), where two or more component carriers (CCs) are aggregated, is supported by LTE in order to provide a better data rate using wider transmission bandwidths. Each CC belongs to a serving cell, which is configured in a higher-layer. A primary cell (PCell) is the cell, operating on the primary frequency, in which the UE 102 either performs the initial connection establishment procedure or initiates the connection re-establishment procedure, or the cell indicated as the primary cell in the handover procedure.

A secondary cell (SCell) is a cell, operating on a secondary frequency, which may be configured once an RRC connection is established and which may be used to provide additional radio resources. For a UE 102 in RRC_CONNECTED not configured with CA, there is only one serving cell comprising of the primary cell. For a UE 102 in RRC_CONNECTED configured with CA, the term "serving cells" is used to denote the set of one or more cells comprising the primary cell and all secondary cells.

A UE 102 may report to an eNB 160 its UE category, which specifies the UE's capabilities on at least the maximum number of DL-SCH transport block bits received within a Transmission Time Interval (TTI), the maximum number of bits of a DL-SCH transport block received within a TTI, the total number of DL-SCH soft channel bits and the maximum number of supported layers for spatial multiplexing in DL. The UE 102 can simultaneously receive or transmit one or multiple component carriers depending on its capabilities. For CA with up to 5 CCs, a UE 102 informs an eNB 160 of its capabilities about supported band combination and the UE 102 may support full simultaneous receptions and/or transmissions on any of reported combinations.

In one implementation, the UE category may be defined according to 3GPP TS 36.306 v.12.3.0. The field ue-Category defines a combined uplink and downlink capability. The parameters set by the UE Category are defined in subclause 4.2. Tables 4.1-1 and 4.1-2 define the downlink and, respectively, uplink physical layer parameter values for each UE Category. Table 1 (based on 3GPP TS 36.306 v.12.3.0 table 4.1-1) provides downlink physical layer parameter values set by the field ue-Category.

TABLE 1

| UE Category | Maximum number of DL-SCH transport block bits received within a TTI (Note 1) | Maximum number of bits of a DL-SCH transport block received within a TTI | Total number of soft channel bits | Maximum number of supported layers for spatial multiplexing in DL |
|---|---|---|---|---|
| Category 0 (Note 2) | 1000 | 1000 | 25344 | 1 |
| Category 1 | 10296 | 10296 | 250368 | 1 |
| Category 2 | 51024 | 51024 | 1237248 | 2 |
| Category 3 | 102048 | 75376 | 1237248 | 2 |
| Category 4 | 150752 | 75376 | 1827072 | 2 |
| Category 5 | 299552 | 149776 | 3667200 | 4 |
| Category 6 | 301504 | 149776 (4 layers) 75376 (2 layers) | 3654144 | 2 or 4 |
| Category 7 | 301504 | 149776 (4 layers) 75376 (2 layers) | 3654144 | 2 or 4 |
| Category 8 | 2998560 | 299856 | 35982720 | 8 |
| Category 9 | 452256 | 149776 (4 layers) 75376 (2 layers) | 5481216 | 2 or 4 |

TABLE 1-continued

| UE Category | Maximum number of DL-SCH transport block bits received within a TTI (Note 1) | Maximum number of bits of a DL-SCH transport block received within a TTI | Total number of soft channel bits | Maximum number of supported layers for spatial multiplexing in DL |
| --- | --- | --- | --- | --- |
| Category 10 | 452256 | 149776 (4 layers)<br>75376 (2 layers) | 5481216 | 2 or 4 |
| Category 11 | 603008 | 149776 (4 layers, 64QAM)<br>195816 (4 layers, 256QAM)<br>75376 (2 layers, 64QAM)<br>97896 (2 layers, 256QAM) | 7308288 | 2 or 4 |
| Category 12 | 603008 | 149776 (4 layers, 64QAM)<br>195816 (4 layers, 256QAM)<br>75376 (2 layers, 64QAM)<br>97896 (2 layers, 256QAM) | 7308288 | 2 or 4 |
| Category 13 | 391632 | 195816 (4 layers)<br>97896 (2 layers) | 3654144 | 2 or 4 |
| Category 14 | 391632 | 195816 (4 layers)<br>97896 (2 layers) | 3654144 | 2 or 4 |
| Category 15 | 3916560 | 391656 | 47431680 | 8 |

NOTE 1:
In carrier aggregation operation, the DL-SCH processing capability can be shared by the UE with that of Multicast Channel (MCH) received from a serving cell. If the total eNB scheduling for DL-SCH and an MCH in one serving cell at a given TTI is larger than the defined processing capability, the prioritization between DL-SCH and MCH is left up to UE implementation.
NOTE 2:
Within one TTI, a UE indicating category 0 shall be able to receive up to 1000 bits for a transport block associated with C-RNTI/Semi-Persistent Scheduling C-RNTI/P-RNTI/SI-RNTI/RA-RNTI and up to 2216 bits for another transport block associated with P-RNTI/SI-RNTI/RA-RNTI As illustrated by Table 1, a UE 102 indicating category 6 or 7 may also indicate category 4. A UE 102 indicating category 8 may also indicate category 5. A UE 102 indicating category 9 may also indicate category 6 and 4. A UE 102 indicating category 10 may also indicate category 7 and 4. A UE 102 indicating category 11 may also indicate category 9, 6 and 4. A UE 102 indicating category 12 may also indicate category 10, 7 and 4. A UE 102 indicating category 13 may also indicate category 6 and 4. A UE 102 indicating category 14 may also indicate category 7 and 4. A UE 102 indicating category 15 may also indicate category 8 and 5. Table 4.1-4 defines the minimum capability for the maximum number of bits of a Multicast Channel (MCH) transport block received within a Transmission Time Interval (TTI) for an Multimedia Broadcast/Multicast Service (MBMS) capable UE 102.

RF parameters are also defined. A field supportedBandListEUTRA defines which E-UTRA radio frequency bands are supported by the UE 102. For each band, support for either only half duplex operation, or full duplex operation is indicated. For TDD, the half duplex indication is not applicable.

A field supportedBandCombination defines the carrier aggregation, MIMO and MBMS reception capabilities supported by the UE 102 for configurations with inter-band, intra-band non-contiguous, intra-band contiguous carrier aggregation and without carrier aggregation. For each band in a band combination, the UE 102 provides the supported CA bandwidth classes and the corresponding MIMO capabilities for downlink. The UE 102 also has to provide the supported uplink CA bandwidth class and the corresponding MIMO capability for at least one band in the band combination. A MIMO capability applies to all carriers of a bandwidth class of a band in a band combination.

In all non-CA band combinations, the UE 102 may indicate a bandwidth class supporting the maximum channel bandwidth defined for the band. Furthermore, in all non-CA band combinations, the UE 102 may indicate at least the number of layers for spatial multiplexing according to the UE's Rel-8/9 category (Cat. 1-5). If the UE 102 provides a Rel-10 category (Cat. 6-8), it may indicate at least the number of layers according to that category for at least one band combination. In all other band combinations, a UE 102 indicating a category between 2 and 15 may indicate support for at least 2 layers for downlink spatial multiplexing for all bands.

The indicated number of layers for spatial multiplexing may exceed the number of layers required according to the category indicated by the UE 102. The carrier aggregation and MIMO capabilities indicated for at least one band combination may meet the processing requirements defined by the physical layer parameter values in the UE category (i.e., maximum number of DL-SCH/UL-SCH transport block bits received/transmitted within a TTI, maximum number of bits of a DL-SCH/UL-SCH transport block received/transmitted within a TTI, and total number of soft channel bits for downlink).

SCell activation deactivation may also be defined. The network can activate and deactivate SCells if the SCells are configured already. The SCell activation and deactivation are initiated by the network's sending of an Activation/Deactivation MAC control element. Moreover, the SCell deactivation can be caused by the expiry of an sCellDeactivation Timer, which is set per configured SCell.

The configured SCells are initially deactivated upon addition and after a handover. On the activated SCell, SRS transmission on the SCell, CSI reporting for the SCell, PDCCH monitoring on the SCell and PDCCH monitoring for the SCell may be performed by the UE 102 on the basis of the network's configuration. These start to be applied no earlier than subframe n+8 and no later than subframe n+34 (or subframe n+24) when the UE 102 receives an activation command for the SCell in subframe n, except for the CSI reporting that is applied in subframe n+8.

On the deactivated SCell, SRS transmission on the SCell, CSI reporting for the SCell, UL-SCH transmission on the SCell, RACH transmission on the SCell, PDCCH monitoring on the SCell and PDCCH monitoring for the SCell may not be performed by the UE 102 even when they are configured. These are applied no later than subframe n+34 (or subframe n+24) when the UE 102 receives an activation command for the SCell in subframe n, except for the CSI reporting that is applied in subframe n+8.

Soft channel bits may be stored. The number of the soft channel bits, which are stored upon decoding failure by the UE 102, may be defined by using the number of configured serving cells that includes both activated cells and deactivated cells. According to 3GPP TS 36.213 v.12.4.0, for FDD, TDD and FDD-TDD, if the UE 102 is configured with more than one serving cell or if the UE 102 is configured with a secondary cell group (SCG), then for each serving cell, for at least $K_{MIMO} \cdot \min(M_{DL\_HARQ}, M_{limit})$ transport blocks, upon decoding failure of a code block of a transport block, the UE 102 may store received soft channel bits corresponding to a range of at least $w_k, w_{k+1}, \ldots, w_{mod(k+n_{SB}-1,N_{cb})}$ where:

$$n_{SB} = \min\left(N_{cb}, \left\lfloor \frac{N'_{soft}}{C \cdot N_{cells}^{DL} \cdot K_{MIMO} \cdot \min(M_{DL\_HARQ}, M_{limit})} \right\rfloor \right),$$

$w_k$, $C$, $N_{cb}$, $K_{MIMO}$, and $M_{limit}$ are defined in subclause 5.1.4.1.2 of [4]. MDL_HARQ is the maximum number of DL HARQ processes.

If the UE 102 is configured with a SCG, $N_{cells}^{DL}$ is the number of configured serving cells across both master cell group (MCG) and SCG. Otherwise, $N_{cells}^{DL}$ is the number of configured serving cells.

If the UE 102 signals ue-Category-v12x y, $N'_{soft}$ is the total number of soft channel bits according to the UE 102 category indicated by ue-Category-v12xy. Else, if the UE 102 signals ue-Category-v1170 and not ue-Category-v12xy, $N'_{soft}$ is the total number of soft channel bits according to the UE 102 category indicated by ue-Category-v1170. Else, if the UE 102 signals ue-Category-v1020 and not ue-Category-v1170 and not ue-Category-v12xy, $N'_{soft}$ is the total number of soft channel bits according to the UE 102 category indicated by ue-Category-v1020. Otherwise, $N'_{soft}$ is the total number of soft channel bits according to the UE 102 category indicated by ue-Category (without suffix).

In determining k, the UE 102 should give priority to storing soft channel bits corresponding to lower values of k. $w_k$ may correspond to a received soft channel bit. The range $w_k, w_{k+1}, \ldots, w_{mod(k+n_{SB}-1,N_{cb})}$ may include subsets not containing received soft channel bits.

The HARQ-ACK codebook size for PUCCH format 3 may also be defined. PUCCH format 3 is utilized to carry the large number of HARQ-ACK (and/or SR) bits. If the UE 102 configured with PUCCH format 3 by higher layers transmits the HARQ-ACK feedback information, the HARQ-ACK feedback consists of the concatenation of HARQ-ACK bits for each of the serving cells. The HARQ-ACK codebook size for PUCCH format 3 is derived from the number of configured serving cells that includes both activated cells and deactivated cells.

For CA beyond 5 CCs, PUCCH format 3 may be used if the total number of bits on the PUCCH is less than or equal to 21 bits (although this may be 22 bits since each RM code can have 11 bits). Moreover, new PUCCH formats (e.g., PUCCH format 4 and 5, etc.) may be specified to support larger payloads, like 64 bits or 128 bits.

Channel coding for UCI HARQ-ACK may be defined according to 3GPP TS 36.212 v12.3.0. The HARQ-ACK bits are received from higher layers for each subframe of each cell. Each positive acknowledgement (ACK) is encoded as a binary '1' and each negative acknowledgement (NACK) is encoded as a binary '0'. For the case where PUCCH format 3 is configured by higher layers and is used for transmission of the HARQ-ACK feedback information, the HARQ-ACK feedback consists of the concatenation of HARQ-ACK bits for each of the serving cells. For cells configured with transmission modes 1, 2, 5, 6 or 7 (i.e., single codeword transmission modes), 1 bit of HARQ-ACK information, $a_k$, is used for that cell. For cells configured with other transmission modes, 2 bits of HARQ-ACK information are used for those cells, i.e., $a_k$, $a_{k+1}$ with $a_k$ corresponding to HARQ-ACK bit for codeword 0 and $a_{k+1}$ corresponding to that for codeword 1.

The parameter $O^{ACK}$ may be defined as the number of HARQ-ACK feedback bits and $N_{A/N}^{PUCCH\ format\ 3}$ as the number of HARQ-ACK feedback bits including the possible concurrent transmission of scheduling request and/or periodic CSI when PUCCH format 3 is used for transmission of HARQ-ACK feedback.

For FDD, the sequence of bits $$\tilde{o}_0^{ACK}, \tilde{o}_1^{ACK}, \ldots, \tilde{o}_{O^{ACK}-1}^{ACK}$$

is the result of the concatenation of HARQ-ACK bits for different cells according to the following pseudo-code in Listing (1).

| Listing (1) |
| --- |
| Set c = 0 - cell index: lower indices correspond to lower RRC indices of corresponding cell |
| Set j = 0 - HARQ-ACK bit index |
| Set $N_{cells}^{DL}$ to the number of cells configured by higher layers for the UE |
| while c < $N_{cells}^{DL}$ |
|   if transmission mode configured in cell c ∈ {1,2,5,6,7} -- 1 bit HARQ-ACK feedback for this cell |
|     $\tilde{o}_j^{ACK}$ = HARQ-ACK bit of this cell |
|     j = j + 1 |
|   else |
|     $\tilde{o}_j^{ACK}$ = HARQ-ACK bit corresponding to the first codeword of this cell |
|     j = j + 1 |
|     $\tilde{o}_j^{ACK}$ = HARQ-ACK bit corresponding to the second codeword of this cell |
|     j = j + 1 |
|   end if |
|   c = c + 1 |
| end while |

For the aggregation of more than one DL cell, including a primary cell using FDD and at least one secondary cell using TDD, the sequence of bits $$\tilde{o}_0^{ACK}, \tilde{o}_1^{ACK}, \ldots, \tilde{o}_{O^{ACK}-1}^{ACK}$$

is the result of the concatenation of HARQ-ACK bits for different cells. $N_{cells}^{DL}$ may be defined as the number of cells configured by higher layers for the UE 102 and $B_c^{DL}$ as the number of subframes for which the UE 102 needs to feed back HARQ-ACK bits in UL subframe n for the c-th serving cell.

For a cell using TDD, the subframes are determined by the DL-reference UL/DL configuration if the UE 102 is configured with higher layer parameter eimta-HarqReferenceConfig, and determined by the UL/DL configuration otherwise. For a cell using TDD, $B_c^{DL}=1$ if subframe n−4 in the cell is a DL subframe or a special subframe with special subframe configurations 1/2/3/4/6/7/8/9 and normal downlink CP or a special subframe with special subframe configurations 1/2/3/5/6/7 and extended downlink CP, and $B_c^{DL}=0$ otherwise. For a cell using FDD, $B_c^{DL}=1$.

The sequence of bits $$\tilde{o}_0^{ACK}, \tilde{o}_1^{ACK}, \ldots, \tilde{o}_{O^{ACK}-1}^{ACK}$$

may be performed according to the following pseudo-code in Listing (2).

Listing (2)

```
Set c = 0 - cell index: lower indices correspond to lower RRC indices of
   corresponding cell
Set j = 0 - HARQ-ACK bit index
while c < N_cells^DL
   if B_c^DL = 1
      if transmission mode configured in cell c ∈ {1,2,5,6,7} - 1 bit
         HARQ-ACK feedback for this cell
         õ_j^ACK = HARQ-ACK bit of this cell
         j = j + 1
      else
         õ_j^ACK = HARQ-ACK bit corresponding to the first codeword of
            this cell
         j = j + 1
         õ_j^ACK = HARQ-ACK bit corresponding to the second codeword of
            this cell
         j = j + 1
      end if
   end if
   c = c + 1
end while
```

For the cases with TDD primary cell, the sequence of bits $$\tilde{o}_0^{ACK}, \tilde{o}_1^{ACK}, \ldots, \tilde{o}_{O^{ACK}-1}^{ACK}$$

is obtained from the HARQ-ACK bits for different cells and different subframes. The parameter $N_{cells}^{DL}$ may be defined as the number of cells configured by higher layers for the UE 102 and $B_c^{DL}$ as the number of subframes for which the UE 102 needs to feed back HARQ-ACK bits in cell c.

The number of HARQ-ACK bits k and the number of HARQ-ACK bits after spatial bundling $k_b$ may be computed according to Listing (3):

Listing (3)

```
Set k = 0 - counter of HARQ-ACK bits
Set k_b = 0 - counter of HARQ-ACK bits after spatial bundling
Set c = 0 - cell index: lower indices correspond to lower RRC indices of
   corresponding cell
while c < N_cells^DL
   set l = 0;
   while l < B_c^DL
      if transmission mode configured in cell c ∈ {1,2,5,6,7} -- 1 bit
         HARQ-ACK feedback for this cell
         k = k + 1
         k_b = k_b + 1
      else
         k = k + 2
         k_b = k_b + 1
      end if
      l = l+1
   end while
   c = c + 1
end while
```

In the case where the transmission of HARQ-ACK feedback using PUCCH format 3 coincides with a sub-frame configured to the UE 102 by higher layers for transmission of scheduling request, the number of scheduling request bit $O^{SR}$ is 1. Otherwise $O^{SR}=0$.

In the case where the transmission of HARQ-ACK feedback using PUCCH format 3 coincides with a sub-frame configured to the UE 102 by higher layers for transmission of periodic CSI, $O^{CSI}$ is the number of periodic CSI bit(s) for the CSI report. Otherwise $O^{CSI}=0$.

The number of HARQ-ACK feedback bits $O^{ACK}$ may be computed according to Listing (4).

Listing (4)

```
Set k_max = 20 when TDD is used in all the configured serving cell(s) of
   the UE and k_max = 21 when FDD is used in at least one of the
   configured serving cells with TDD primary cell.
If k ≤ k_max and O^CSI = 0, or if k + O^CSI + O^SR ≤ 22 and O^CSI > 0, or if
   k_b + O^CSI + O^SR > 22 and k ≤ k_max, then
   O^ACK = k
else,
   O^ACK = k_b
```

If $O^{ACK}=k$, the multiplexing of HARQ-ACK bits may be performed according to the following pseudo-code in Listing (5).

Listing (5)

```
Set c = 0 - cell index: lower indices correspond to lower RRC indices of
   corresponding cell
Set j = 0 - HARQ-ACK bit index
while c < N_cells^DL
   set l = 0;
   while l < B_c^DL
      if transmission mode configured in cell c ∈ {1,2,5,6,7} -- 1 bit
         HARQ-ACK feedback for this cell
         õ_j^ACK = o_{c,l}^ACK HARQ-ACK bit of this cell as defined in
            Section 7.3 of [3]
         j = j + 1
      else
         [õ_j^ACK, õ_{j+1}^ACK] = [o_{c,2l}^ACK, o_{c,2l+1}^ACK] HARQ-ACK bit of this
            cell as defined in Section 7.3 of [3]
         j = j + 2
```

-continued

Listing (5)

```
    end if
    l = l+1
  end while
  c = c + 1
end while
```

If $O^{ACK}=k_b$, spatial bundling is applied to all subframes in all cells and the multiplexing of HARQ-ACK bits is performed according to the following pseudo-code in Listing (6).

Listing (6)

```
Set c = 0 - cell index: lower indices correspond to lower RRC indices of
    corresponding cell
Set j = 0 - HARQ-ACK bit index
while c < N_cells^DL
  set l = 0;
  while l < B_c^DL
    if transmission mode configured in cell c ∈ {1,2,5,6,7} - 1 bit
      HARQ-ACK feedback for this cell
      õ_j^ACK = o_{c,l}^ACK HARQ-ACK bit of this cell as defined in Section
          7.3 of [3]
      j = j + 1
    else
      õ_j^ACK = o_{c,l}^ACK binary AND operation of the HARQ-ACK
          bits corresponding to the first and second codewords of this
          cell as defined in Section 7.3 of [3]
      j = j + 1
    end if
    l = l+1
  end while
  c = c + 1
end while
```

In the case where the transmission of HARQ-ACK feedback using PUCCH format 3 coincides with a sub-frame configured to the UE 102 by higher layers for transmission of scheduling request, the scheduling request bit (1=positive SR; 0=negative SR) is appended at the end of the sequence of concatenated HARQ-ACK bits.

A serving cell group may also be defined. For dual connectivity (DC), which is a mode of operation for a UE 102 in RRC_CONNECTED, a master and a secondary cell group may be used. A master cell group (MCG) is a group of serving cells of a UE 102, configured with dual connectivity, comprising of the PCell and zero or more secondary cells. A secondary cell group (SCG) is a group of secondary cells of a UE 102, configured with dual connectivity, comprising of the Primary SCell (PSCell) and possibly one or more secondary cells. In a PSCell, the UE 102 may perform some of the same functions as in a PCell, such as HARQ-ACK and/or scheduling request (SR) transmission on PUCCH, channel state information (CSI) reporting on PUCCH, monitoring of PDCCH on common search space (CSS), monitoring of downlink radio link quality, adjustment of uplink transmission timing for PUCCH/PUSCH/SRS, etc.

Licensed-Assisted Access (LAA) in unlicensed band for LTE, also known as LTE unlicensed or unlicensed LTE, allows opportunistic usage of unlicensed carrier for LTE transmissions. In the first stage, only DL LAA is considered in which a LAA eNB 160 transmits DL subframes on one or more unlicensed carriers in an opportunistic way. However, both UL and DL transmission may be performed in LAA. Thus, a LAA UE 102 may also transmit UL signals on one or more unlicensed carriers in an opportunistic way.

As used herein, a "LAA node" may refer to a "LAA eNB" that performs DL transmissions in unlicensed carriers, or a "LAA UE" that supports UL transmissions in unlicensed carriers. The LAA transmission is assisted with a licensed band, and carrier aggregation (CA) is the baseline assumption for an unlicensed LAA cell operating with a licensed LTE cell.

With CA, the radio frame (i.e., the system frame number (SFN)) is synchronized across all serving cells. Furthermore, the subframe indexes are also synchronized. In a CA case, the maximum TA differences among serving cells is 33 microseconds.

In a LAA network, the DL or UL transmission is performed in an opportunistic manner. For fairness utilization, a LAA node (e.g., a LAA eNB 160 or a LAA UE 102) may perform functions such as clear channel assessment (CCA) and listen before talk (LBT) before any transmission. Thus, a LAA transmission cannot guarantee that a transmission starts at fixed subframe boundaries.

Therefore, a first LAA subframe transmission may need to perform carrier sensing, and if there is no ongoing transmissions, the LAA subframe may be transmitted. Otherwise, the LAA node may defer the transmission, and perform clear channel assessment again at the next contention access region.

In LAA, the serving cell may be synchronized with a licensed cell. The time used for carrier sensing and CCA will be removed from the first LAA subframe transmission.

CA may also be performed with more than 5 CCs. An objective for CA with more than 5 CCs is LAA. This is because an LTE network may use many channels in unlicensed bands as well as the CCs in the licensed bands that have been used for the LTE network.

For CA with more than 5 CCs, $N_{cells}^{DL}$, which is used to define the procedure for CA with up to 5 CCs, may be replaced with a new parameter $N'_{cells}^{DL}$, where $N_{PDSCH}^{DL} <= N'_{cells}^{DL} <= N_{cells}^{DL}$. $N_{PDSCH}^{DL}$ is the total number of cells in which PDSCH (or SPS release) intended to the UE 102 is transmitted in subframe n. For example, $N_{cells}^{DL}$ in Listings (1) to (6) may be replaced with $N'_{cells}^{DL}$. An example of these parameters is described in connection with FIG. 4.

In a first approach, the parameter $N'_{cells}^{DL}$ may be indicated by UE 102 capability. If the UE 102 does not support simultaneous reception on $N_{cells}^{DL}$ cells, $N'_{cells}^{DL}$ may be given by new UE 102 capability information that indicates the number of serving cells on which the UE 102 is able to receive (decode) DL channels (e.g. PDCCH, EPDCCH and PDSCH) simultaneously. That is, even if the UE 102 can be configured with more than $N'_{cells}^{DL}$ serving cells, the UE 102 does not support simultaneous reception on more than $N'_{cells}^{DL}$ serving cells. Otherwise, $N'_{cells}^{DL}$ is equal to $N_{cells}^{DL}$ that is the number of cells configured by higher layers for the UE 102.

In a second approach, the parameter $N'_{cells}^{DL}$ may be configured by higher layer signaling. For the UE 102 configured with more than 5 serving cells, $N'_{cells}^{DL}$ may be given by higher layer parameter eca-nDLCELLS (e.g., RRC information element for configuration of $N'_{cells}^{DL}$), which is configured by a dedicated RRC message. Otherwise, $N'_{cells}^{DL}$ is equal to $N_{cells}^{DL}$.

In a third approach, for the UE 102 configured with higher layer parameter eca-nDLCELLS, $N'_{cells}^{DL}$ may be given by that parameter. Otherwise, $N'_{cells}^{DL}$ is equal to $N_{cells}^{DL}$.

In a fourth approach, the parameter $N'_{cells}^{DL}$ may based on the number of activated cells. In this approach, $N'_{cells}^{DL}$ may be given by the number of activated serving cells if the UE 102 is configured with higher layer parameter eca-Config. Otherwise, $N'_{cells}{}^{DL}$ is equal to $N_{cells}{}^{DL}$.

To avoid ambiguity between the eNB 160 and the UE 102, whenever there is a cell activation or deactivation, the number of activated cells of a UE 102 may be configured by a higher layer signaling. Alternatively, the number of activated cells of a UE 102 may be reported to the eNB 160 by the UE 102. Also, CSI reporting may be applied only for the activated serving cells if the UE 102 is configured with higher layer parameter eca-Config. In this case, CSI codebook size may be derived by the number of the activated serving cells.

In a fifth approach, the parameter $N'_{cells}{}^{DL}$ may be determined from a field in the DCI format of (E)PDCCH if the UE 102 is configured with higher layer parameter eca-Config (RRC information element for eCA configuration). Otherwise, $N'_{cells}{}^{DL}$ is equal to $N_{cells}{}^{DL}$.

$N'_{cells}{}^{DL}$ may be used instead of $N_{cells}{}^{DL}$ for derivation of other parameter(s) such as the number of stored channel bits and HARQ-ACK codebook size for PUCCH format 3. More specifically, DCI format may have a field, which is present if the UE 102 is configured with higher layer parameter eca-Config. The field is not present if the UE 102 is not configured with higher layer parameter eca-Config. The field might not be present when the (E)PDCCH is transmitted or monitored in common search space. If the UE 102 is configured with higher layer parameter eca-Config, the UE 102 may read this field.

This DCI format field may indicate the number of serving cells that should be assumed for the DL subframe where the (E)PDCCH is transmitted. The field may also indicate the number of all PDSCHs scheduled in the DL subframe where the (E)PDCCH is transmitted. The field may additionally indicate the number of scheduled PDSCHs whose HARQ-ACKs are fed back in the UL subframe where HARQ-ACKs for the PDSCH associated with the (E)PDCCH is transmitted.

The field may further indicate a PDSCH number among all PDSCHs scheduled in the DL subframe where the (E)PDCCH is transmitted. The scheduled PDSCHs may be numbered in sequential order according to increasing frequency.

The field may also indicate the number which is derived by applying a mathematical processing (e.g. modulo arithmetic) to one of the above numbers, or the like. For example, the UE 102 may use $W+M[(U-W)/M]$ for determining the number of stored channel bits and HARQ-ACK codebook size for PUCCH format 3, where W is the value corresponding to the value of the field, M is the number of values that the field can express (i.e., M may be $2^n$, if the field consists of n bits, e.g. M=3 and the field consists of 3 bits), and U denotes the maximum value of $U_c$ among all the configured serving cells. $U_c$ is the total number of received PDSCHs and PDCCH/EPDCCH indicating downlink SPS release in the subframe where the (E)PDCCH carrying the field is transmitted/monitored.

In a sixth approach, the parameter $N'_{cells}{}^{DL}$ may be determined by a semi-static configured subset of serving cells. The configuration may be signaled by RRC signaling. For example, the RRC signaling may signal a list of serving cell indexes that a UE 102 should monitor among all configured serving cells. $N'_{cells}{}^{DL}$ is the number of cells included in the semi-static configured subset of serving cells. Otherwise, $N'_{cells}{}^{DL}$ is equal to $N_{cells}{}^{DL}$. A new subset of serving cells may be indicated if the eNB 160 decides to modify the current monitored serving cells for the UE 102.

The parameter $N'_{cells}{}^{DL}$ may be used for soft buffer handling and HARQ-ACK codebook size. In one implementation, the UE soft channel bits determination module 126 may determine the number of storing soft channel bits on the basis of $N'_{cells}{}^{DL}$. The UE HARQ-ACK codebook size determination module 128 may determine the HARQ-ACK codebook size for one or more PDSCHs based on $N'_{cells}{}^{DL}$.

Once $N'_{cells}{}^{DL}$ is determined, no matter which approach is used, $N'_{cells}{}^{DL}$ may be used instead of $N_{cells}{}^{DL}$ for derivation of other parameter(s) such as the number of stored channel bits and HARQ-ACK codebook size for PUCCH format 3. Therefore, for eNBs 160 and UEs 102 supporting more than 5 CCs, $N'_{cells}{}^{DL}$ may be used to replace $N_{cells}{}^{DL}$ in the previous specification sections.

With this approach, UEs 102 can utilize their buffer to store soft channel bits more efficiently, even if the network configures several channels (e.g. 32 CCs) so as to enjoy the dynamic channel selection gain. It should be noted that instead of eCA-Config, either one of SCellToAddModList-r13, radioResourceConfigCommonSCell-r13 or radioResourceConfigDedicatedSCell-r13 can be used. These information elements support more than 5 CCs, though SCellToAddModList-r10, radioResourceConfigCommonSCell-r10 and radioResourceConfigDedicatedSCell-r10 support just up to 5 CCs.

For all of these approaches above, only the maximum soft buffer for HARQ process can be determined by the new parameter. But the UE 102 may still need to buffer all cells if it cannot know which cells should be monitored in advance. For self-scheduling, the UE 102 needs to buffer the subframes and decode (E)PDCCH to see whether PDSCH is scheduled for the given UE 102. Even for cross-carrier scheduling, the UE 102 still needs to buffer the subframes, but only needs to decode those indicated by the cross-carrier scheduling.

Another approach is to support cross-subframe scheduling. In this approach, a PDSCH may be scheduled in a (E)PDCCH of a previous subframe. In this case, the UE 102 knows which cells should be monitored and how many PDSCHs are scheduled. In this approach, the parameter $N'_{cells}{}^{DL}$ may be determined based on the number of CCs scheduled.

PUCCH performance may improve because the HARQ-ACK codebook size decreases even if the network can perform dynamic channel selection among several channels (e.g., 32 CCs). It should be noted that this is applicable not only on PUCCH Format 3, but also on new PUCCH formats that support larger payload sizes.

Any combination of the above approaches may also be adopted. For instance, for the UE 102 configured with more than 5 serving cells, if the UE 102 does not support simultaneous reception on $N_{cells}{}^{DL}$ cells, $N'_{cells}{}^{DL}$ may be given by the UE capability information. Otherwise, $N'_{cells}{}^{DL}$ is equal to $N_{cells}{}^{DL}$. In another example, for the UE 102 configured with more than 5 serving cells, $N'_{cells}{}^{DL}$ may be given by the number of activated serving cells if the UE 102 is configured with higher layer parameter eca-Config. Otherwise, $N'_{cells}{}^{DL}$ is equal to $N_{cells}{}^{DL}$. Note that PDCCH/EPDCCH indicating downlink SPS release may also be counted for the above PDSCH numbering/accumulation.

$N'_{cells}{}^{DL}$ may be applied regardless of serving cell type and duplex type. Alternatively, $N'_{cells}{}^{DL}$ may be applied to LAA serving cells and $N_{cells}{}^{DL}$ may be used in normal serving cells (e.g., non-LAA cells).

The UE operations module 124 may provide information 148 to the one or more receivers 120. For example, the UE operations module 124 may inform the receiver(s) 120 when or when not to send PDSCH HARQ-ACK information based on the set of downlink subframe associations.

The UE operations module 124 may provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the transmission data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113, a data buffer 162 and an eNB operations module 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the eNB operations module 182 to perform one or more operations.

In general, the eNB operations module 182 may enable the eNB 160 to communicate with the one or more UEs 102. The eNB operations module 182 may include one or more of an eNB soft channel bits determination module 194 and an eNB HARQ-ACK codebook size determination module 196.

As described above, the parameter $N'_{cells}{}^{DL}$ may be used for soft buffer handling and HARQ-ACK codebook size. In one implementation, the eNB soft channel bits determination module 194 may determine the number of storing soft channel bits on the basis of $N'_{cells}{}^{DL}$. The eNB HARQ-ACK codebook size determination module 196 may determine the HARQ-ACK codebook size for one or more PDSCHs based on $N'_{cells}{}^{DL}$. The parameter $N'_{cells}{}^{DL}$ may be determined as described above.

The eNB operations module 182 may provide information 190 to the one or more receivers 178. For example, the eNB operations module 182 may inform the receiver(s) 178 when or when not to receive PDSCH HARQ-ACK information based on the set of downlink subframe associations.

The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 101 to the encoder 109. The information 101 may include data to be encoded and/or instructions for encoding. For example, the eNB operations module 182 may instruct the encoder 109 to encode transmission data 105 and/or other information 101.

The encoder 109 may encode transmission data 105 and/or other information 101 provided by the eNB operations module 182. For example, encoding the transmission data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
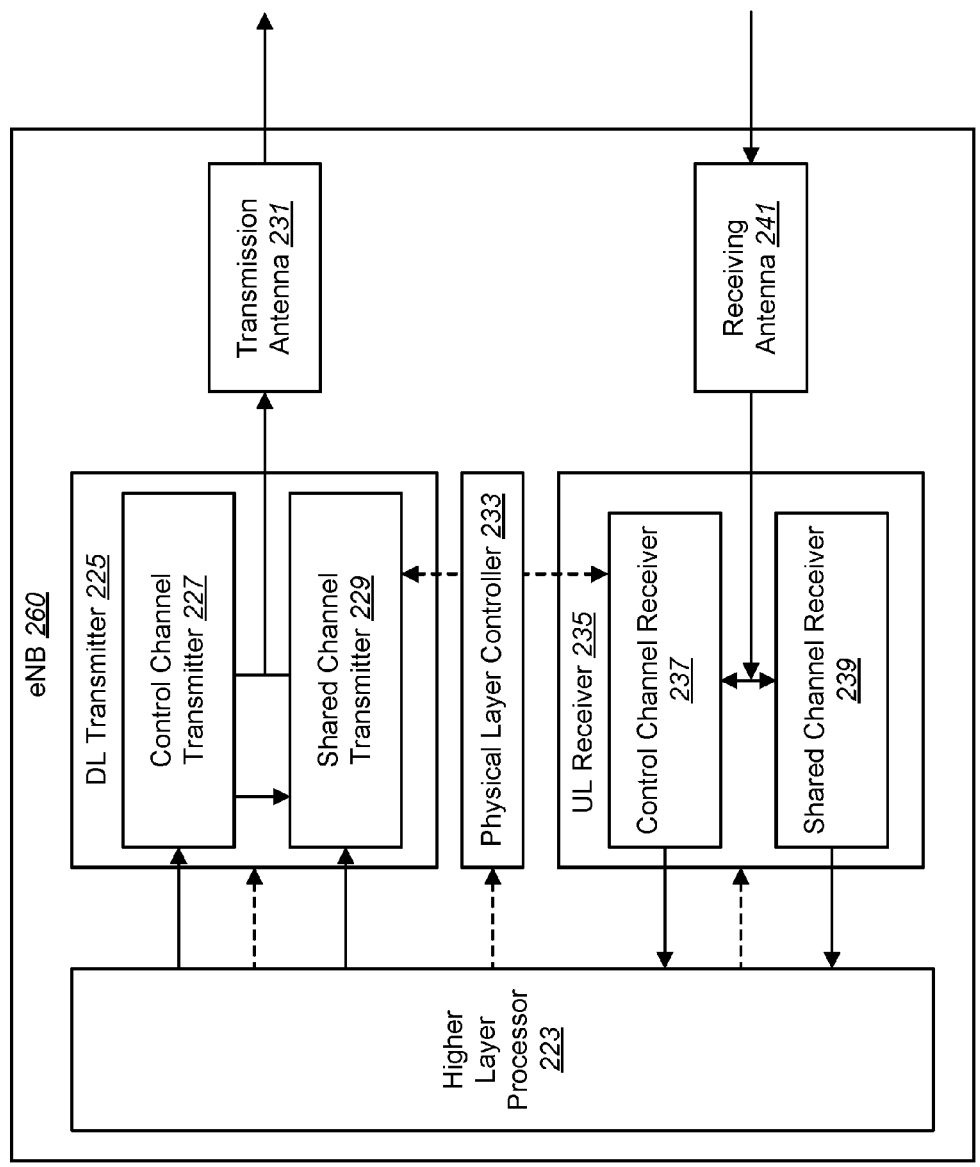
FIG. 2 is a block diagram illustrating a detailed configuration of an eNB in which systems and methods for carrier aggregation may be implemented.

FIG. 2 is a block diagram illustrating a detailed configuration of an eNB 260 in which systems and methods for carrier aggregation may be implemented. The eNB 260 may include a higher layer processor 223, a physical layer controller 233, a DL transmitter 225 and a UL receiver 235. The higher layer processor 223 may communicate with the physical layer controller 233, the DL transmitter 225, UL receiver 235 and subsystems of each.

The DL transmitter 225 may include a control channel transmitter 227 (e.g., Physical downlink control channel transmitter) and a shared channel transmitter 229 (e.g., Physical downlink shared channel transmitter). The DL transmitter 225 may transmit signals/channels to the UE 302 using a transmission antenna 231. The UL receiver 235 may include a control channel receiver 237 (e.g., Physical uplink control channel receiver) and a shared channel receiver 239 (e.g., Physical uplink shared channel receiver). The UL receiver 235 may receive signals/channels from a UE 302 using a receiving antenna 241.

The higher layer processor 223 may send the UE 302 a higher layer control message (e.g., common RRC message, dedicated RRC message) and may configure a plurality of serving cells in the UE 302 via higher layer signaling. RRC messages may be delivered from the higher layer processor 223 to the physical downlink shared channel transmitter 229 and are carried by PDSCH.

The physical downlink shared channel transmitter 229 may generate PDSCH containing control messages and/or data provided by higher layer processor 223 and may transmit the PDSCH. For retransmission, the physical downlink shared channel transmitter 229 may also re-generate PDSCH containing the same control messages and/or data and may re-transmit the PDSCH. Here, the parameter for the PDSCH retransmission may be based on the number of soft channel bits stored by the UE 302, which is provided by the physical layer controller 233.

The physical downlink control channel transmitter 227 may generate PDCCH/EPDCCH with the DCI format and may transmit the PDCCH/EPDCCH. The DCI format may have several information fields (e.g., carrier indicator field, resource allocation header field, resource block assignment, modulation and coding scheme field, etc.). The DCI format may also have a field to indicate $N'^{DL}_{cells}$.

The DL transmitter 225 may multiplex the PDSCH and the PDCCH/EPDCCH. The DL transmitter 225 may also generate an OFDM signal and may transmit the OFDM signal via the transmission antenna 231.

The UL receiver 235 may receive an SC-FDMA signal via the receiving antenna 241 and may de-multiplex the PUSCH and the PUCCH.

The physical uplink control channel receiver 237 may receive the PUCCH carrying HARQ-ACK, SR and/or CSI and may deliver these control messages to the higher layer processor 223. For PUCCH format 3, the reception process (e.g., decoding) may be based on HARQ-ACK codebook size, which is provided by the physical layer controller 233.

The physical uplink shared channel receiver 239 may receive the PUSCH carrying data and/or RRC message (e.g., the UE capability report) and may deliver the data and/or the RRC message to the higher layer processor 223. The higher layer processor 223 may provide the physical layer controller 233 information about the RRC message.

In one implementation, the eNB 260 may perform one or more of the following behaviors. The eNB 260 may configure multiple SCells to a UE 302. The eNB 260 may transmit PDSCHs on some of the SCells. The eNB 260 may receive NACK for the PDSCHs. The eNB 260 may retransmit the PDSCHs.

The parameters for the PDSCH retransmissions may be determined based on the number of soft channel bits stored by the UE 302 that the PDSCHs are intended for. The number of soft channel bits may be based on $N'^{DL}_{cells}$.

In another implementation, the eNB 260 may configure multiple SCells to a UE 302. The eNB 260 may transmit PDSCHs on some of the SCells. The eNB 260 may receive HARQ-ACK bits carried by PUCCH format 3. The HARQ-ACK codebook size may be determined based on $N'^{DL}_{cells}$.

Figure 3:
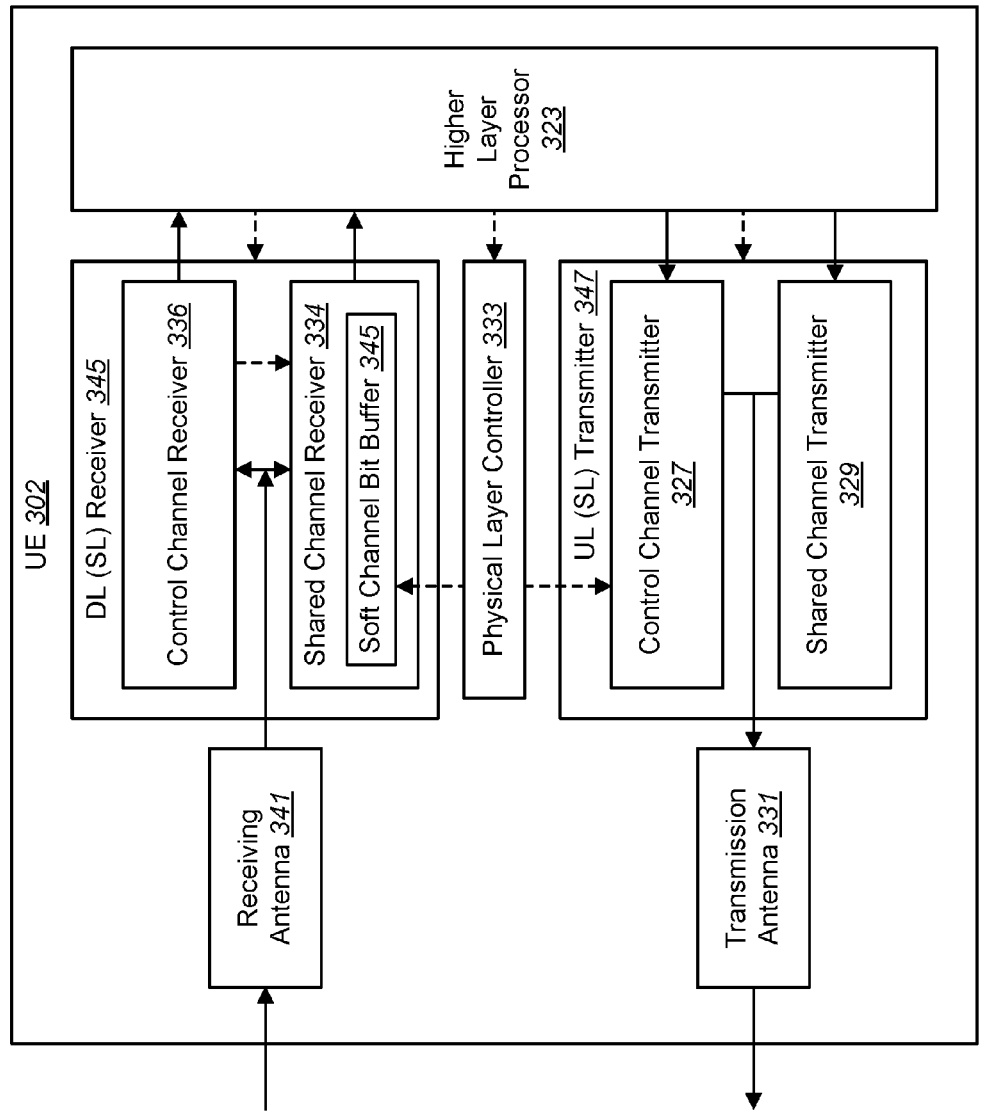
FIG. 3 is a block diagram illustrating a detailed configuration of a UE in which systems and methods for carrier aggregation may be implemented.

FIG. 3 is a block diagram illustrating a detailed configuration of a UE 302 in which systems and methods for carrier aggregation may be implemented. The UE 302 may include a higher layer processor 323, physical layer controller 333, a DL (SL) receiver 343 and a UL (SL) transmitter 347. The higher layer processor 323 may communicate with the physical layer controller 333, the DL (SL) receiver 343, UL (SL) transmitter 347 and subsystems of each.

The DL (SL) receiver 343 may include a control channel receiver 337 (e.g., Physical downlink control channel receiver) and a shared channel receiver 339 (e.g., Physical downlink shared channel receiver). The DL (SL) receiver 343 may receive signals/channels from the UE 302 using a receiving antenna 341. The UL (SL) transmitter 347 may include a control channel transmitter 327 (e.g., Physical uplink control channel transmitter) and a shared channel transmitter 329 (e.g., Physical uplink shared channel transmitter). The UL (SL) transmitter 347 may send signals/channels to the eNB 260 using a transmission antenna 331. The shared channel receiver 339 may include a soft channel bit buffer 345.

The DL (SL) receiver 343 may receive an OFDM signal via the receiving antenna 341 and may de-multiplex the PDSCH and the PDCCH/EPDCCH. The physical downlink shared channel receiver 339 may receive the PDSCH containing control messages and/or data. If the receiving process is successful, the physical downlink shared channel receiver 339 may deliver the control messages and/or data to the higher layer processor 323.

If the receiving process fails, soft channel bits, which are derived from the received PDSCH, are stored in the soft channel bit buffer 345. Here, the number of soft channel bits stored by the UE 302 is provided by the physical layer controller 333. For retransmission, the physical downlink shared channel receiver 339 may combine the soft channel bits derived from the re-transmitted PDSCH and those stored in the soft channel bit buffer 345. If the receiving process is successful, the physical downlink shared channel receiver 339 may deliver the control messages and/or the data to the higher layer processor 323. If the receiving process fails, the combined soft channel bits are stored in the soft channel bit buffer 345.

The physical downlink control channel receiver 337 may receive the PDCCH/EPDCCH and may provide the physical downlink shared channel receiver 339 information about corresponding PDSCH (e.g., carrier indicator field, resource allocation header field, resource block assignment, modulation and coding scheme field, etc.). If the DCI format has the field to indicate $N'_{cells}{}^{DL}$, the physical downlink control channel receiver 337 may provide the physical layer controller 333 information about $N'_{cells}{}^{DL}$.

The higher layer processor 323 may receive a higher layer control message (e.g., common RRC message, dedicated RRC message) and may configure a plurality of serving cells based on higher layer signaling. RRC messages carried by PDSCH are delivered from the physical downlink shared channel transmitter 329 to the higher layer processor 323.

The physical uplink control channel transmitter 327 may generate and transmit the PUCCH carrying HARQ-ACK, SR and/or CSI. For PUCCH format 3, the generation process (e.g., coding) may be based on the HARQ-ACK codebook size, which is provided by the physical layer controller 333.

The physical uplink shared channel receiver 339 may generate and transmit the PUSCH carrying data and/or RRC message (e.g., UE capability report) which are delivered by the higher layer processor 323. The UL (SL) transmitter 347 may multiplex the PUSCH and the PUCCH, may generate an SC-FDMA signal and may transmit an SC-FDMA signal via the transmission antenna 331. The higher layer processor 323 may provide the physical layer controller 333 information about the RRC message.

In one implementation, the UE 302 may perform one or more of the following behaviors. The UE 302 may be configured with multiple SCells. The UE 302 may receive PDSCHs on some of the SCells. The UE 302 may fail to decode PDSCHs correctly. The UE 302 may store soft channel bits of the PDSCHs. The number of soft channel bits may be based on $N'_{cells}{}^{DL}$.

In another implementation, the UE 302 may be configured with multiple SCells. The UE 302 may receive PDSCHs on some of the SCells. The UE 302 may transmit PUCCH format 3 carrying HARQ-ACK bits for received PDSCHs. The HARQ-ACK codebook size may be determined based on $N'_{cells}{}^{DL}$.

Figure 4:
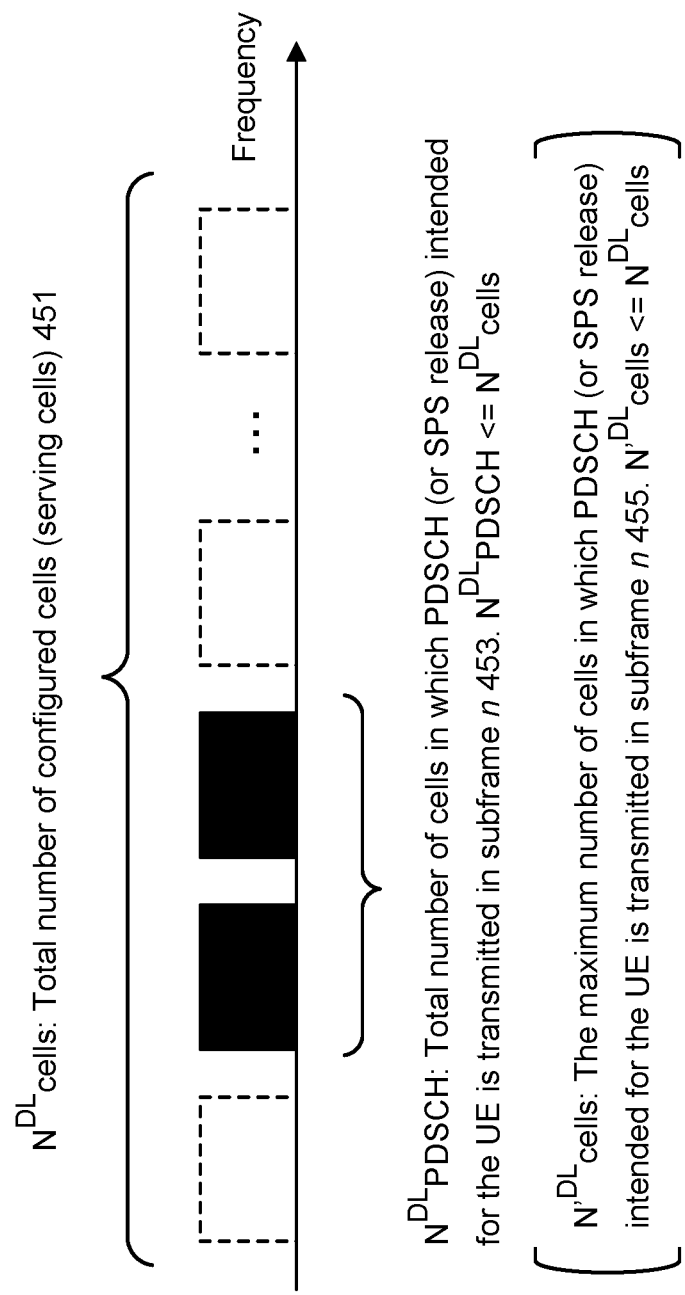
FIG. 4 is a block diagram illustrating a number of configured cells and parameters for carrier aggregation.

FIG. 4 is a block diagram illustrating a number of configured cells and parameters for carrier aggregation. $N_{cells}{}^{DL}$ is the total number of configured cells 451 (e.g., serving cells). $N_{PDSCH}{}^{DL}$ is the total number of cells 453 in which PDSCH (or SPS release) intended to the UE 102 is transmitted in subframe n. $N'_{cells}{}^{DL}$ is the maximum number of cells 455 in which PDSCH (or SPS release) intended to the UE 102 is transmitted in subframe n. It should be noted that $N_{PDSCH}{}^{DL} <= N'_{cells}{}^{DL} <= N_{cells}{}^{DL}$.

Figure 5:
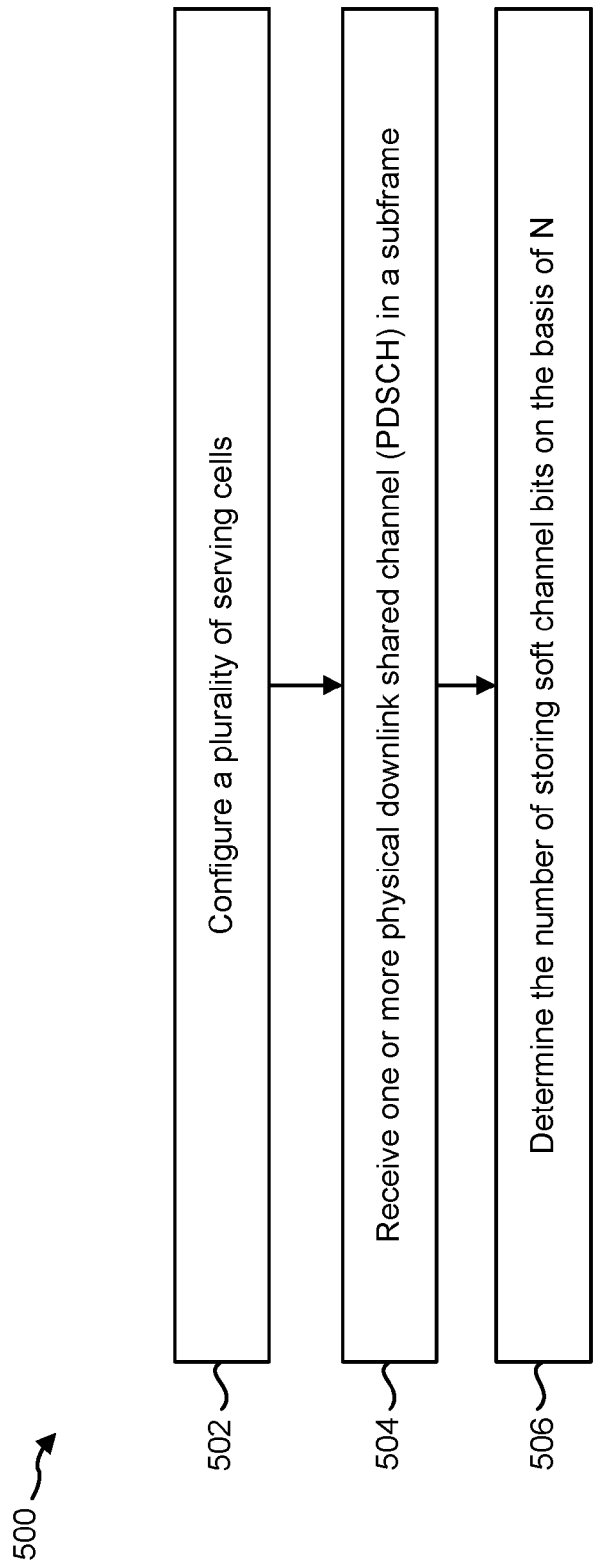
FIG. 5 is a flow diagram illustrating one implementation of a method for performing carrier aggregation by a UE.

FIG. 5 is a flow diagram illustrating one implementation of a method 500 for performing carrier aggregation by a UE 102. The UE 102 may be located in a wireless communication network in which carrier aggregation may be performed.

The UE 102 may configure 502 a plurality of serving cells. For example, a higher layer processor 323 may be configured or programmed to configure the plurality of serving cells.

The UE 102 may receive 504 one or more physical downlink shared channel (PDSCH) in a subframe. For example, a physical downlink shared channel receiver 339 may be configured or programmed to receive 504 one or more physical downlink shared channel (PDSCH) in a subframe.

The UE 102 may determine 506 the number of storing soft channel bits on the basis of N. For example, a physical layer controller 333 may be configured or programmed to determine the number of storing soft channel bits. N may be the maximum number of serving cells on which the UE 102 is able to receive physical channels in a subframe. N may be smaller than the number of the configured serving cells. N may be the parameter $N'_{cells}{}^{DL}$ described above.

Figure 6:
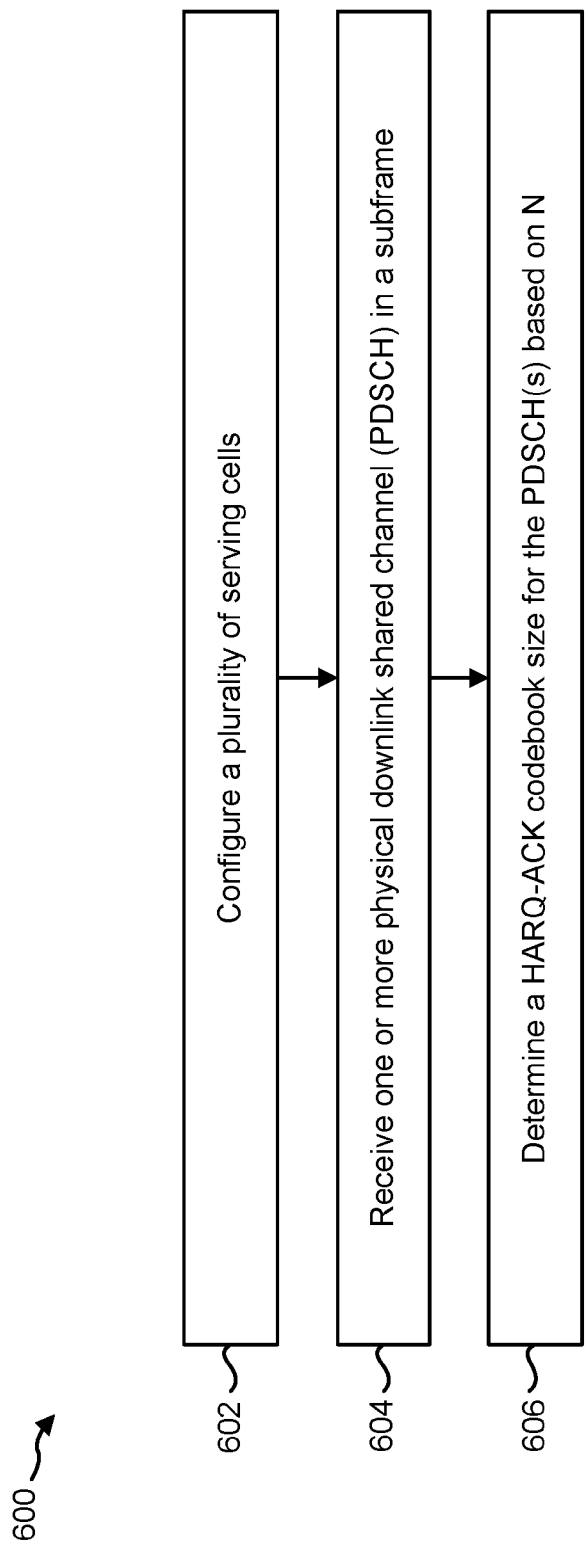
FIG. 6 is a flow diagram illustrating another implementation of a method for performing carrier aggregation by a UE.

FIG. 6 is a flow diagram illustrating another implementation of a method 600 for performing carrier aggregation by a UE 102. The UE 102 may be located in a wireless communication network in which carrier aggregation may be performed.

The UE 102 may configure 602 a plurality of serving cells. For example, a higher layer processor 323 may be configured or programmed to configure the plurality of serving cells.

The UE 102 may receive 604 one or more physical downlink shared channel (PDSCH) in a subframe. For example, a physical downlink shared channel receiver 339 may be configured or programmed to receive 604 one or more physical downlink shared channel (PDSCH) in a subframe.

The UE 102 may determine 606 a HARQ-ACK codebook size for the PDSCH(s) based on N. For example, a physical layer controller 333 may be configured or programmed to determine the HARQ-ACK codebook size for the PDSCH(s). N may be smaller than the number of the configured serving cells. N may be the parameter $N'_{cells}{}^{DL}$ described above.

Figure 7:
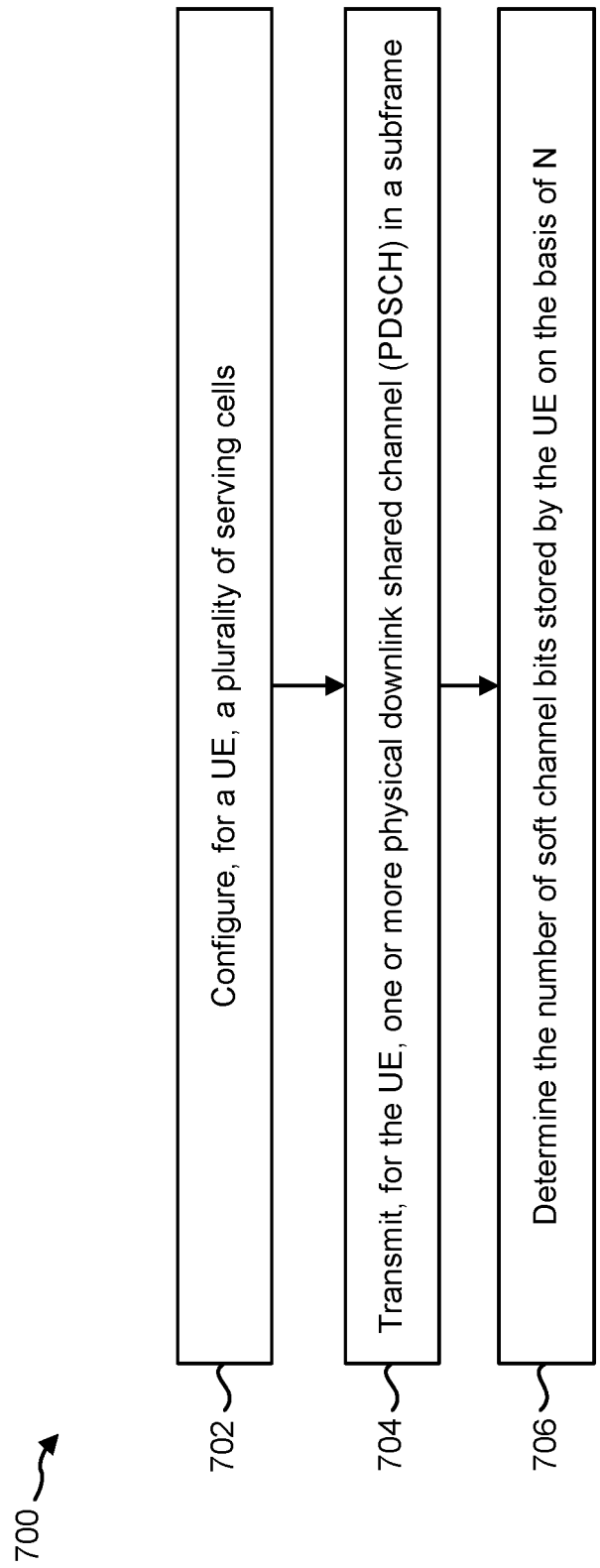
FIG. 7 is a flow diagram illustrating one implementation of a method for performing carrier aggregation by an eNB.

FIG. 7 is a flow diagram illustrating one implementation of a method 700 for performing carrier aggregation by an eNB 160. The eNB 160 may be located in a wireless communication network in which carrier aggregation may be performed. The eNB 160 may communicate with a UE 102.

The eNB 160 may configure 702, for the UE 102, a plurality of serving cells. For example, a higher layer processor 223 may be configured or programmed to configure 702, for the UE 102, a plurality of serving cells.

The eNB 160 may transmit 704, for the UE 102, one or more physical downlink shared channel (PDSCH) in a subframe. For example, a physical downlink shared channel transmitter 229 may be configured or programmed to transmit 704, for the UE 102, one or more PDSCH in a subframe.

The eNB 160 may determine 706 the number of soft channel bits stored by the UE 102 on the basis of N. For example, a physical layer controller 233 may be configured or programmed to determine the number of soft channel bits stored by the UE 102. N may be the maximum number of serving cells on which the UE 102 is able to receive physical channels in a subframe. N may be smaller than the number of the configured serving cells. N may be the parameter $N'_{cells}{}^{DL}$ described above.

Figure 8:
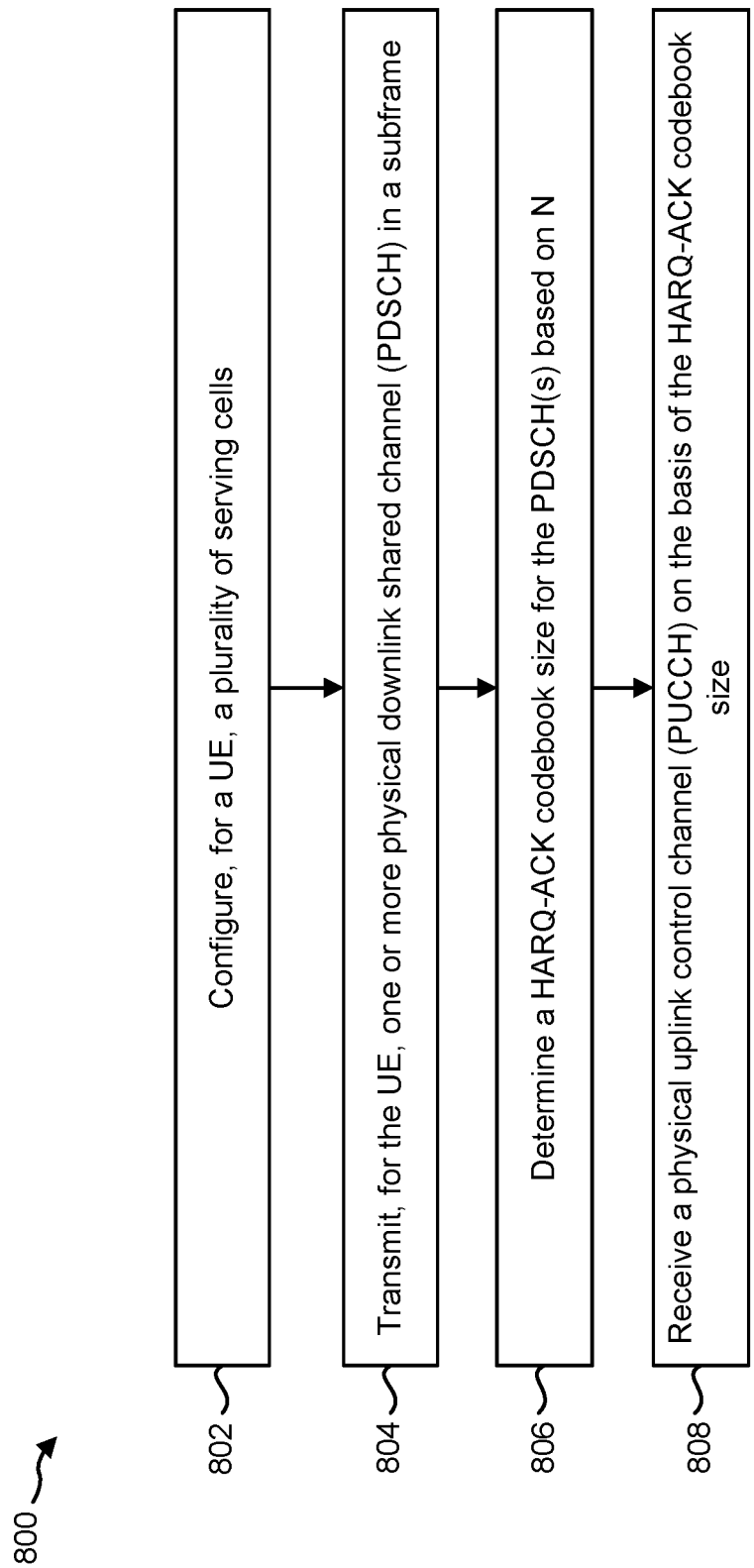
FIG. 8 is a flow diagram illustrating another implementation of a method for performing carrier aggregation by an eNB.

FIG. 8 is a flow diagram illustrating another implementation of a method 800 for performing carrier aggregation by an eNB 160. The eNB 160 may be located in a wireless communication network in which carrier aggregation may be performed. The eNB 160 may communicate with a UE 102.

The eNB 160 may configure 802, for the UE 102, a plurality of serving cells. For example, a higher layer processor 223 may be configured or programmed to configure 802, for the UE 102, a plurality of serving cells.

The eNB 160 may transmit 804, for the UE 102, one or more physical downlink shared channel (PDSCH) in a subframe. For example, a physical downlink shared channel transmitter 229 may be configured or programmed to transmit, for the UE 102, one or more PDSCH in a subframe.

The eNB 160 may determine 806 a HARQ-ACK codebook size for the PDSCH(s) based on N. For example, a physical layer controller 233 may be configured or programmed to determine 806 the HARQ-ACK codebook size for the PDSCH(s). N may be smaller than the number of the configured serving cells. N may be the parameter $N'^{DL}_{cell}$ described above.

The eNB 160 may receive 808 a physical uplink control channel (PUCCH) on the basis of the HARQ-ACK codebook size. For example, a physical uplink control channel receiver 237 may be configured or programmed to receive 808 a PUCCH on the basis of the HARQ-ACK codebook size.

Figure 9:
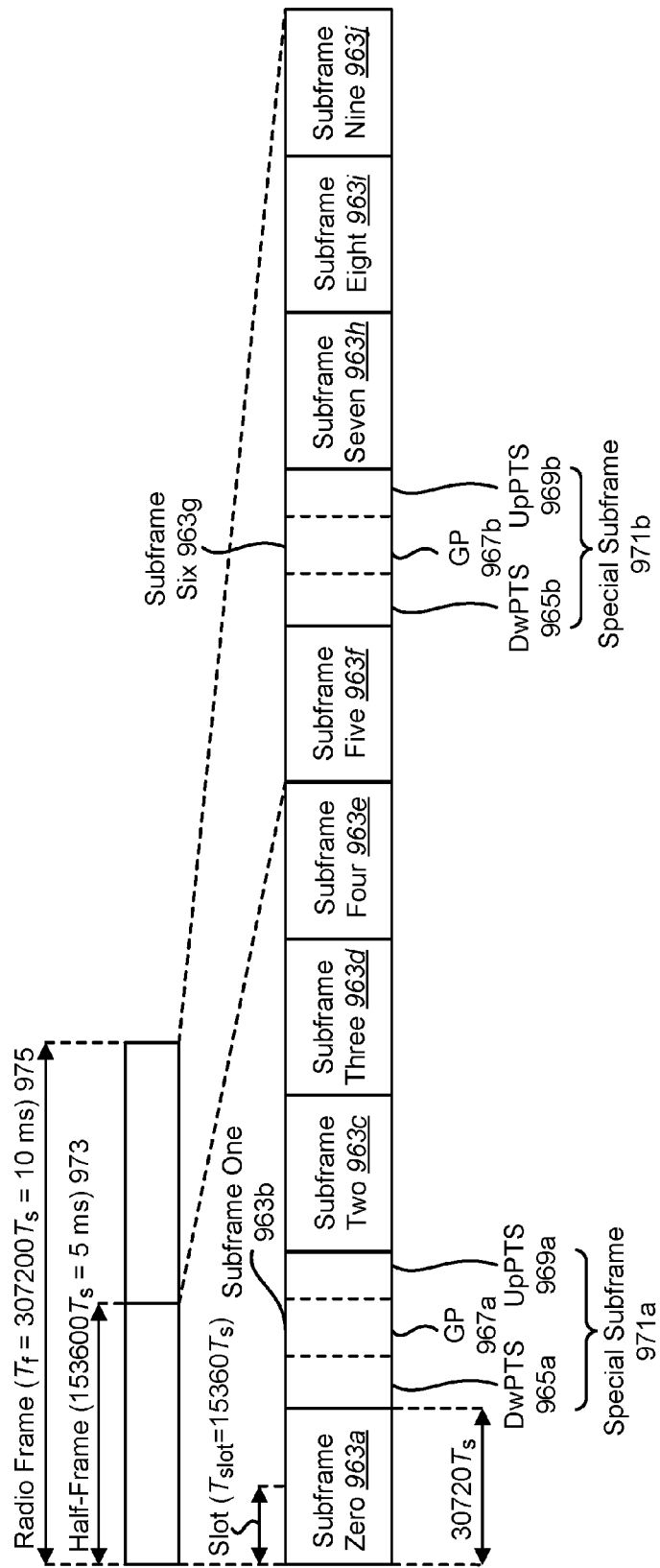
FIG. 9 is a diagram illustrating one example of a radio frame that may be used in accordance with the systems and methods disclosed herein.

FIG. 9 is a diagram illustrating one example of a radio frame 975 that may be used in accordance with the systems and methods disclosed herein. This radio frame 975 structure illustrates a TDD structure. Each radio frame 975 may have a length of $T_f=307200 \cdot T_s=10$ ms, where $T_f$ is a radio frame 975 duration and $T_s$ is a time unit equal to $$\frac{1}{(15000 \times 2048)} \text{ seconds.}$$

seconds. The frame 975 may include two half-frames 973, each having a length of $153600 \cdot T_s=5$ ms. Each half-frame 973 may include five subframes 963a-e, 963f-j each having a length of $30720 \cdot T_s=1$ ms.

TDD UL/DL configurations 0-6 are given below in Table 2 (from Table 4.2-2 in 3GPP TS 36.211). UL/DL configurations with both 5 millisecond (ms) and 10 ms downlink-to-uplink switch-point periodicity may be supported. In particular, seven UL/DL configurations are specified in 3GPP specifications, as shown in Table 2 below. In Table 2, "D" denotes a downlink subframe, "S" denotes a special subframe and "U" denotes a UL subframe.

TABLE 2

| TDD UL/DL Configuration Number | Downlink-to-Uplink Switch-Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2 above, for each subframe in a radio frame, "D" indicates that the subframe is reserved for downlink transmissions, "U" indicates that the subframe is reserved for uplink transmissions and "S" indicates a special subframe with three fields: a downlink pilot time slot (DwPTS), a guard period (GP) and an uplink pilot time slot (UpPTS). The length of DwPTS and UpPTS is given in Table 3 (from Table 4.2-1 of 3GPP TS 36.211) subject to the total length of DwPTS, GP and UpPTS being equal to $30720 \cdot T_s=1$ ms. In Table 3, "cyclic prefix" is abbreviated as "CP" and "configuration" is abbreviated as "Config" for convenience.

TABLE 3

| | Normal CP in downlink | | | Extended CP in downlink | | |
|---|---|---|---|---|---|---|
| | | UpPTS | | | UpPTS | |
| Special Subframe Config | DwPTS | Normal CP in uplink | Extended CP in uplink | DwPTS | Normal CP in uplink | Extended CP in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

UL/DL configurations with both 5 ms and 10 ms downlink-to-uplink switch-point periodicity are supported. In the case of 5 ms downlink-to-uplink switch-point periodicity, the special subframe exists in both half-frames. In the case of 10 ms downlink-to-uplink switch-point periodicity, the special subframe exists in the first half-frame only. Subframes 0 and 5 and DwPTS may be reserved for downlink transmission. UpPTS and the subframe immediately following the special subframe may be reserved for uplink transmission.

In accordance with the systems and methods disclosed herein, some types of subframes 963 that may be used include a downlink subframe, an uplink subframe and a special subframe 971. In the example illustrated in FIG. 9, which has a 5 ms periodicity, two standard special subframes 971a-b are included in the radio frame 975.

The first special subframe 971a includes a downlink pilot time slot (DwPTS) 965a, a guard period (GP) 967a and an uplink pilot time slot (UpPTS) 969a. In this example, the first standard special subframe 971a is included in subframe one 963b. The second standard special subframe 971b includes a downlink pilot time slot (DwPTS) 965b, a guard period (GP) 967b and an uplink pilot time slot (UpPTS) 969b. In this example, the second standard special subframe 971b is included in subframe six 963g. The length of the DwPTS 965a-b and UpPTS 969a-b may be given by Table 4.2-1 of 3GPP TS 36.211 (illustrated in Table 3 above) subject to the total length of each set of DwPTS 965, GP 967 and UpPTS 969 being equal to $30720 \cdot T_s = 1$ ms.

Each subframe i 963a-j (where i denotes a subframe ranging from subframe zero 963a (e.g., 0) to subframe nine 963j (e.g., 9) in this example) is defined as two slots, 2i and 2i+1 of length $T_{slot} = 15360 \cdot T_s = 0.5$ ms in each subframe 963. For example, subframe zero (e.g., 0) 963a may include two slots, including a first slot.

UL/DL configurations with both 5 ms and 10 ms downlink-to-uplink switch-point periodicity may be used in accordance with the systems and methods disclosed herein. FIG. 9 illustrates one example of a radio frame 975 with 5 ms switch-point periodicity. In the case of 5 ms downlink-to-uplink switch-point periodicity, each half-frame 973 includes a standard special subframe 971a-b. In the case of 10 ms downlink-to-uplink switch-point periodicity, a special subframe 971 may exist in the first half-frame 973 only.

Subframe zero (e.g., 0) 963a and subframe five (e.g., 5) 963f and DwPTS 965a-b may be reserved for downlink transmission. The UpPTS 969a-b and the subframe(s) immediately following the special subframe(s) 971a-b (e.g., subframe two 963c and subframe seven 963h) may be reserved for uplink transmission. It should be noted that, in some implementations, special subframes 971 may be considered DL subframes in order to determine a set of DL subframe associations that indicate UCI transmission uplink subframes of a UCI transmission cell.

Figure 10:
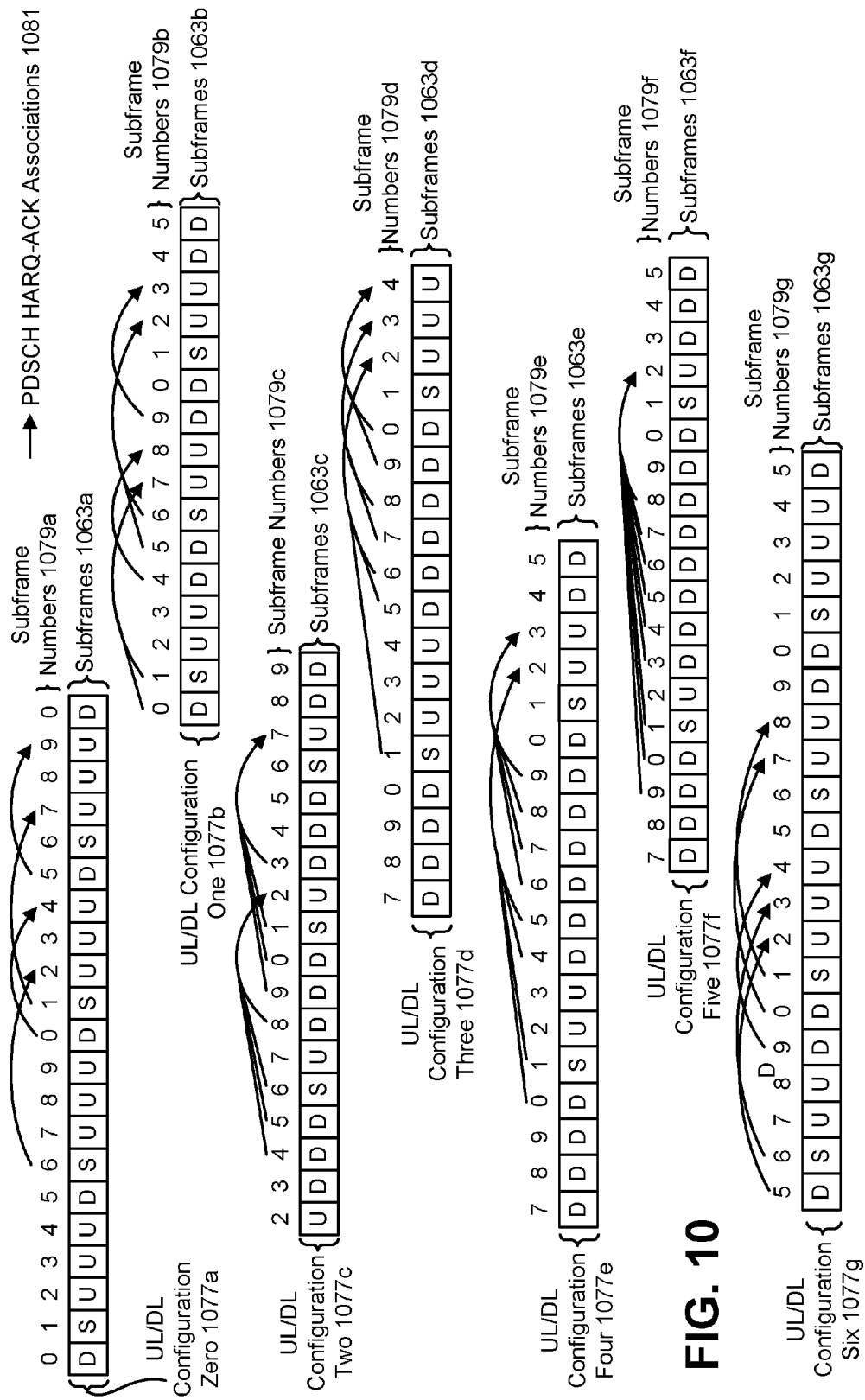
FIG. 10 is a diagram illustrating some time division duplexing (TDD) uplink/downlink (UL/DL) configurations in accordance with the systems and methods described herein.

FIG. 10 is a diagram illustrating some TDD UL/DL configurations 1077a-g in accordance with the systems and methods described herein. There are seven different TDD UL/DL configurations, all with different association timings. In particular, FIG. 10 illustrates UL/DL configuration zero 1077a (e.g., "UL/DL configuration 0") with subframes 1063a and subframe numbers 1079a, UL/DL configuration one 1077b (e.g., "UL/DL configuration 1") with subframes 1063b and subframe numbers 1079b, UL/DL configuration two 1077c (e.g., "UL/DL configuration 2") with subframes 1063c and subframe numbers 1079c and UL/DL configuration three 1077d (e.g., "UL/DL configuration 3") with subframes 1063d and subframe numbers 1079d. FIG. 10 also illustrates UL/DL configuration four 1077e (e.g., "UL/DL configuration 4") with subframes 1063e and subframe numbers 1079e, UL/DL configuration five 1077f (e.g., "UL/DL configuration 5") with subframes 1063f and subframe numbers 1079f and UL/DL configuration six 1077g (e.g., "UL/DL configuration 6") with subframes 1063g and subframe numbers 1079g.

FIG. 10 further illustrates PDSCH HARQ-ACK associations 1081 (e.g., PDSCH HARQ-ACK feedback on PUCCH or PUSCH associations). The PDSCH HARQ-ACK associations 1081 may indicate HARQ-ACK reporting subframes corresponding to subframes for PDSCH transmissions (e.g., subframes in which PDSCH transmissions may be sent and/or received). It should be noted that some of the radio frames 435 illustrated in FIG. 10 have been truncated for convenience.

Figure 11:
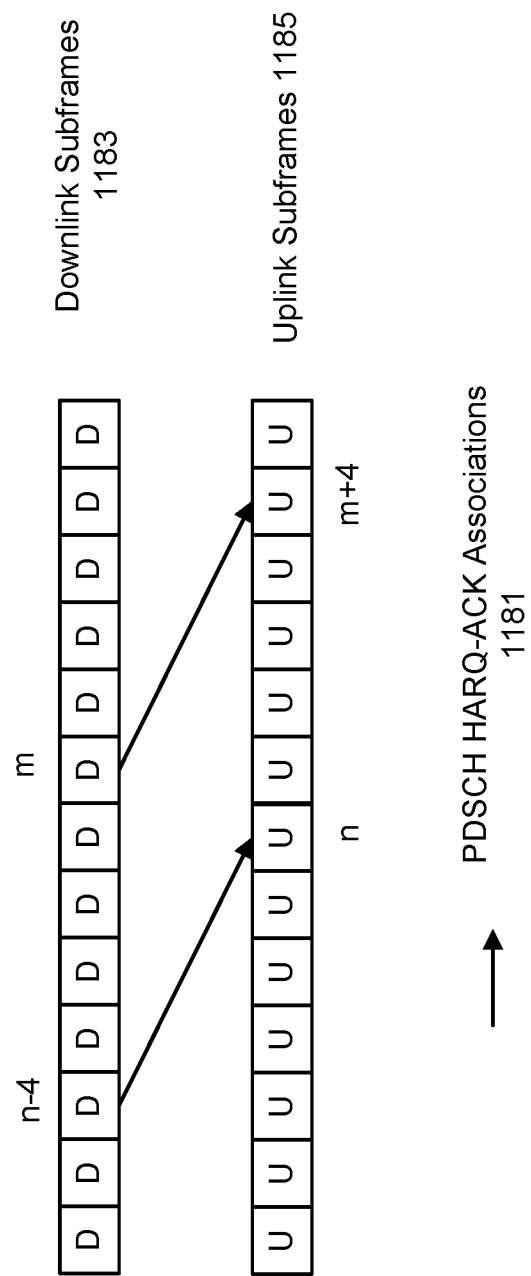
FIG. 11 illustrates the association timings of a frequency division duplexing (FDD) cell.

FIG. 11 illustrates the association timings of a FDD cell. The FDD cell may include paired downlink subframes 1183 and uplink subframes 1185. The PDSCH HARQ-ACK associations 1181 for an FDD cell are illustrated. The PDSCH HARQ-ACK associations 1181 may indicate HARQ-ACK reporting subframes corresponding to subframes for PDSCH transmissions (e.g., subframes in which PDSCH transmissions may be sent and/or received). In some implementations, the PDSCH HARQ-ACK reporting may occur on a PUCCH or a PUSCH.

A fixed 4 ms interval may be applied to the PDSCH HARQ-ACK associations 1181. In one implementation, each of the downlink subframes 1183 and uplink subframes 1185 may be 1 ms. Therefore, the PDSCH HARQ-ACK transmission in subframe m+4 may be associated with a PDSCH transmission in subframe m. Similarly, a PDSCH transmission in subframe n−4 may be associated with the PDSCH HARQ-ACK transmission in subframe n.

Figure 12:
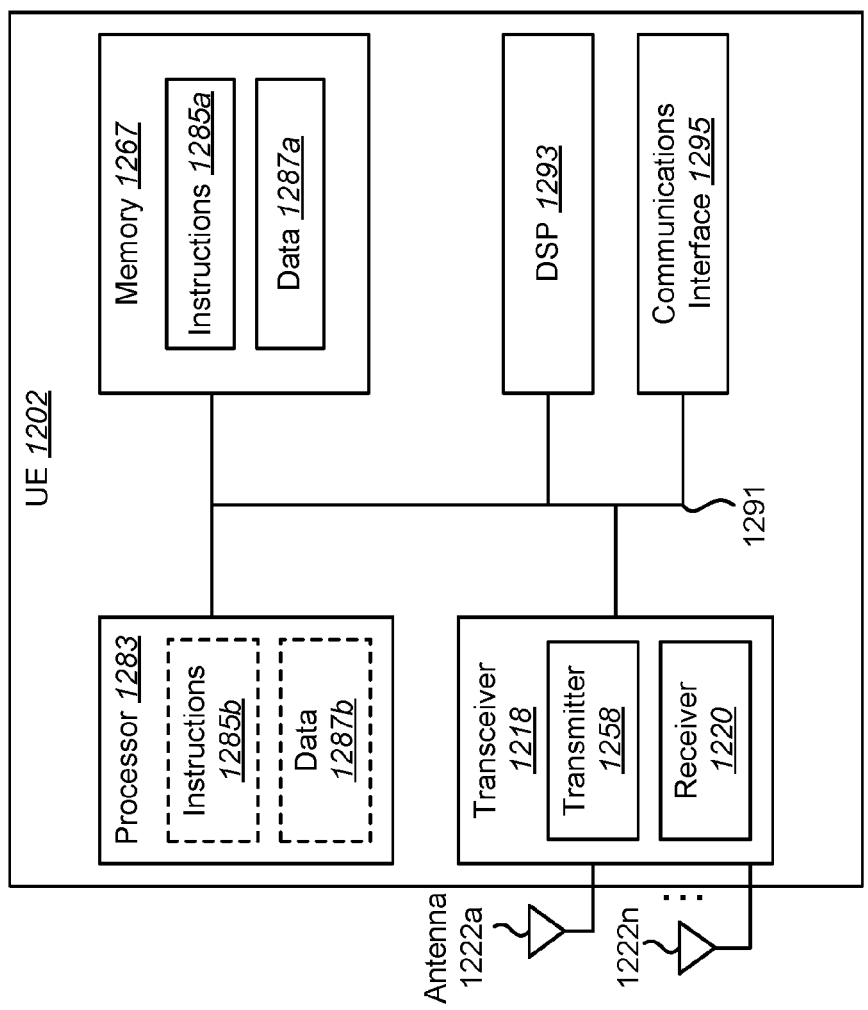
FIG. 12 illustrates various components that may be utilized in a UE.

FIG. 12 illustrates various components that may be utilized in a UE 1202. The UE 1202 described in connection with FIG. 12 may be implemented in accordance with the UE 102 described in connection with FIG. 1. The UE 1202 includes a processor 1283 that controls operation of the UE 1202. The processor 1283 may also be referred to as a central processing unit (CPU). Memory 1289, which may include read-only memory (ROM), random access memory (RAM), a combination of the two or any type of device that may store information, provides instructions 1285a and data 1287a to the processor 1283. A portion of the memory 1289 may also include non-volatile random access memory (NVRAM). Instructions 1285b and data 1287b may also reside in the processor 1283. Instructions 1285b and/or data 1287b loaded into the processor 1283 may also include instructions 1285a and/or data 1287a from memory 1289 that were loaded for execution or processing by the processor 1283. The instructions 1285b may be executed by the processor 1283 to implement one or more of the methods 500, 600 and 800 described above.

The UE 1202 may also include a housing that contains one or more transmitters 1258 and one or more receivers 1220 to allow transmission and reception of data. The transmitter(s) 1258 and receiver(s) 1220 may be combined into one or more transceivers 1218. One or more antennas 1222a-n are attached to the housing and electrically coupled to the transceiver 1218.

The various components of the UE 1202 are coupled together by a bus system 1291, which may include a power bus, a control signal bus and a status signal bus, in addition to a data bus. However, for the sake of clarity, the various buses are illustrated in FIG. 12 as the bus system 1291. The UE 1202 may also include a digital signal processor (DSP) 1293 for use in processing signals. The UE 1202 may also include a communications interface 1295 that provides user access to the functions of the UE 1202. The UE 1202 illustrated in FIG. 12 is a functional block diagram rather than a listing of specific components.

Figure 13:
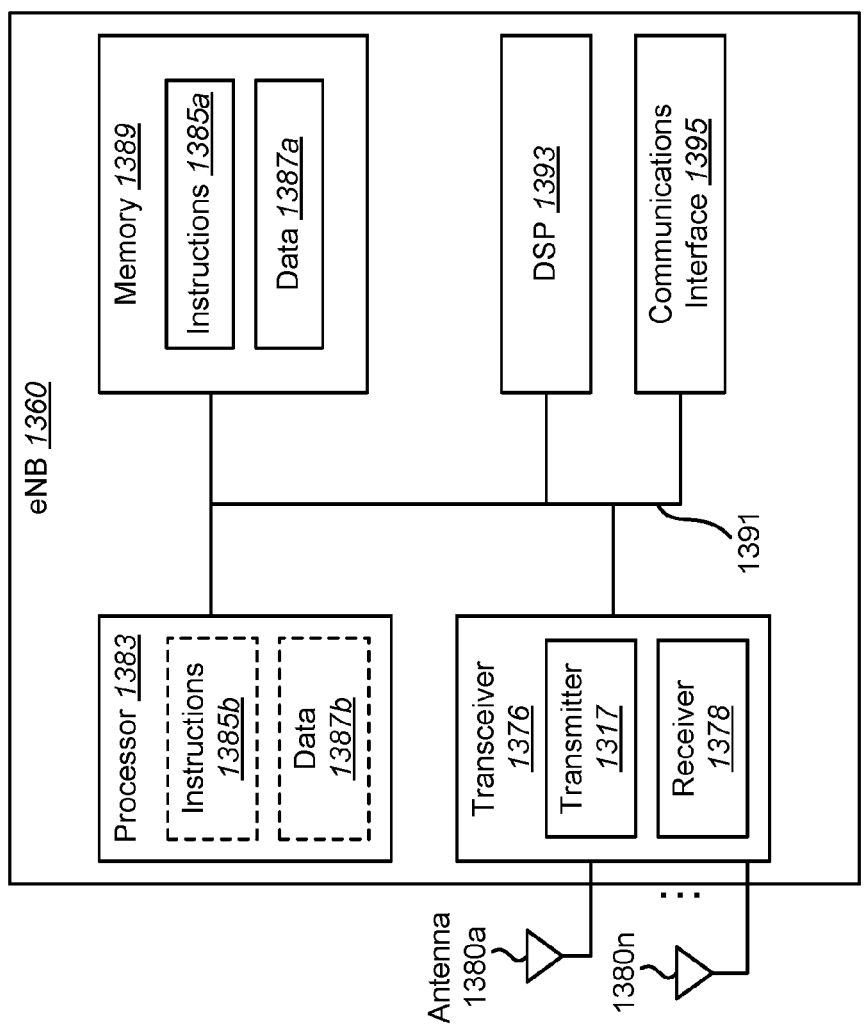
FIG. 13 illustrates various components that may be utilized in an eNB.

FIG. 13 illustrates various components that may be utilized in an eNB 1360. The eNB 1360 described in connection with FIG. 13 may be implemented in accordance with the eNB 160 described in connection with FIG. 1. The eNB 1360 includes a processor 1383 that controls operation of the eNB 1360. The processor 1383 may also be referred to as a central processing unit (CPU). Memory 1389, which may include read-only memory (ROM), random access memory (RAM), a combination of the two or any type of device that may store information, provides instructions 1385a and data 1387a to the processor 1383. A portion of the memory 1389 may also include non-volatile random access memory (NVRAM). Instructions 1385b and data 1387b may also reside in the processor 1383. Instructions 1385b and/or data 1387b loaded into the processor 1383 may also include instructions 1385*a* and/or data 1387*a* from memory 1389 that were loaded for execution or processing by the processor 1383. The instructions 1385*b* may be executed by the processor 1383 to implement the method 700, 800 described above.

The eNB 1360 may also include a housing that contains one or more transmitters 1317 and one or more receivers 1378 to allow transmission and reception of data. The transmitter(s) 1317 and receiver(s) 1378 may be combined into one or more transceivers 1376. One or more antennas 1380*a-n* are attached to the housing and electrically coupled to the transceiver 1376.

The various components of the eNB 1360 are coupled together by a bus system 1391, which may include a power bus, a control signal bus and a status signal bus, in addition to a data bus. However, for the sake of clarity, the various buses are illustrated in FIG. 13 as the bus system 1391. The eNB 1360 may also include a digital signal processor (DSP) 1393 for use in processing signals. The eNB 1360 may also include a communications interface 1395 that provides user access to the functions of the eNB 1360. The eNB 1360 illustrated in FIG. 13 is a functional block diagram rather than a listing of specific components.

Figure 14:
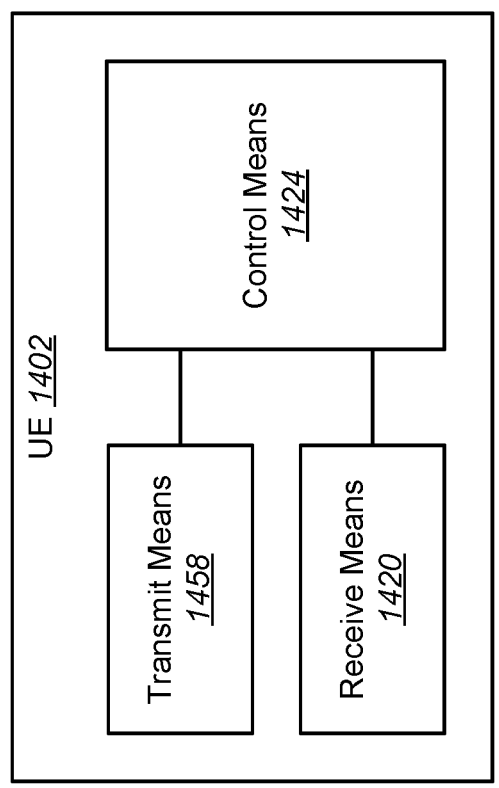
FIG. 14 is a block diagram illustrating one configuration of a UE in which systems and methods for performing carrier aggregation may be implemented.

FIG. 14 is a block diagram illustrating one implementation of a UE 1402 in which systems and methods for performing carrier aggregation may be implemented. The UE 1402 includes transmit means 1458, receive means 1420 and control means 1424. The transmit means 1458, receive means 1420 and control means 1424 may be configured to perform one or more of the functions described in connection with FIG. 5 and FIG. 6 above. FIG. 12 above illustrates one example of a concrete apparatus structure of FIG. 14. Other various structures may be implemented to realize one or more of the functions of FIG. 14. For example, a DSP may be realized by software.

Figure 15:
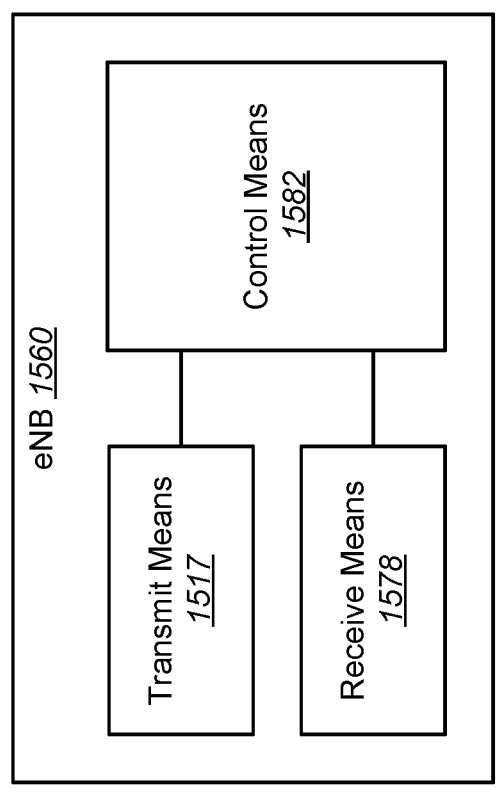
FIG. 15 is a block diagram illustrating one configuration of an eNB in which systems and methods for performing carrier aggregation may be implemented.

FIG. 15 is a block diagram illustrating one implementation of an eNB 1560 in which systems and methods for performing carrier aggregation may be implemented. The eNB 1560 includes transmit means 1517, receive means 1578 and control means 1582. The transmit means 1517, receive means 1578 and control means 1582 may be configured to perform one or more of the functions described in connection with FIG. 7 and FIG. 8 above. FIG. 13 above illustrates one example of a concrete apparatus structure of FIG. 15. Other various structures may be implemented to realize one or more of the functions of FIG. 15. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the eNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the eNB 160 and the UE 102 according to the systems and methods described above may be realized as an LSI that is a typical integrated circuit. Each functional block of the eNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

What is claimed is:

1. A user equipment (UE) comprising:
   a higher layer processor configured/programmed to configure a plurality of serving cells;
   a physical downlink shared channel receiver configured/programmed to receive one or more physical downlink shared channel (PDSCH) in a subframe; and
   a physical layer controller configured/programmed to determine the number of storing soft channel bits on the basis of N, wherein N is the maximum number of serving cells on which the UE is able to receive physical channels in a subframe, wherein N is smaller than the number of the configured serving cells, and wherein the physical layer controller determines the number of storing soft channel bits on the basis of the number of the configured serving cells if the number of the configured serving cells is up to M, wherein M is a positive integer greater than one and less than the maximum number of serving cells that the UE supports.

2. A user equipment (UE) comprising:
   a higher layer processor configured/programmed to configure a plurality of serving cells;
   a physical downlink shared channel receiver configured/programmed to receive one or more physical downlink shared channel (PDSCH) in a subframe; and
   a physical layer controller configured/programmed to determine the number of storing soft channel bits on the basis of N, wherein N is the maximum number of serving cells on which the UE is able to receive physical channels in a subframe, wherein N is smaller than the number of the configured serving cells, and wherein N is derived from a field in a downlink control information (DCI) format of which a physical downlink control channel (PDCCH) is transmitted in the subframe.

3. A base station communicating with a user equipment (UE), the base station comprising:
   a higher layer processor configured/programmed to configure, for the UE, a plurality of serving cells;
   a physical downlink shared channel transmitter configured/programmed to transmit, for the UE, one or more physical downlink shared channel (PDSCH) in a subframe; and
   a physical layer controller configured/programmed to determine the number of soft channel bits stored by the UE on the basis of N, wherein N is the maximum number of serving cells on which the UE is able to receive physical channels in a subframe, wherein N is smaller than the number of the configured serving cells, and wherein the physical layer controller determines the number of soft channel bits stored by the UE on the basis of the number of the configured serving cells if the number of the configured serving cells is up to M, wherein M is a positive integer greater than one and less than the maximum number of serving cells that the UE supports.

4. A base station communicating with a user equipment (UE), the base station comprising:
   a higher layer processor configured/programmed to configure, for the UE, a plurality of serving cells;
   a physical downlink shared channel transmitter configured/programmed to transmit, for the UE, one or more physical downlink shared channel (PDSCH) in a subframe;
   a physical layer controller configured/programmed to determine the number of soft channel bits stored by the UE on the basis of N, wherein N is the maximum number of serving cells on which the UE is able to receive physical channels in a subframe, wherein N is smaller than the number of the configured serving cells; and
   a physical downlink control channel transmitter configured/programmed to transmit, in the subframe, a physical downlink control channel (PDCCH) with a downlink control information (DCI) format, the DCI format including a field indicating N.

* * * * *

UNITED STATES PATENT AND TRADEMARK OFFICE
CERTIFICATE OF CORRECTION

PATENT NO. : 9,998,264 B2
APPLICATION NO. : 15/093431
DATED : June 12, 2018
INVENTOR(S) : Toshizo Nogami et al.

It is certified that error appears in the above-identified patent and that said Letters Patent is hereby corrected as shown below:

In the Specification

In Column 16, Line 65 please delete "may based" and replace it with --may be based--.
In Column 25, Line 56 please delete "The frame" and replace it with --The radio frame--.

Signed and Sealed this
Sixth Day of November, 2018

Andrei Iancu
*Director of the United States Patent and Trademark Office*